(12) United States Patent
Ue

(10) Patent No.: US 6,346,710 B1
(45) Date of Patent: Feb. 12, 2002

(54) STAGE APPARATUS INCLUDING DISPLACEMENT AMPLIFYING MECHANISM

(75) Inventor: Yoshihiro Ue, Hidaka (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/385,560

(22) Filed: Aug. 30, 1999

(30) Foreign Application Priority Data

| Aug. 31, 1998 | (JP) | 10-245169 |
| Sep. 21, 1998 | (JP) | 10-266625 |
| Mar. 4, 1999 | (JP) | 11-056818 |

(51) Int. Cl.[7] ............ G02B 21/26; G21K 5/10; G05G 11/00
(52) U.S. Cl. ............ 250/442.11; 250/440.11; 250/306; 250/311; 74/479; 74/471 XY
(58) Field of Search ............ 250/442.11, 440.11, 250/306, 311; 74/479, 471 XY

(56) References Cited

U.S. PATENT DOCUMENTS

| 4,409,860 A | 10/1983 | Moriyama et al. ............ 74/479 |
| 4,805,543 A | 2/1989 | Schwab et al. ............ 108/20 |
| 5,051,594 A | 9/1991 | Tsuda et al. ............ 250/442.1 |
| 5,092,193 A | 3/1992 | Yanagisawa ............ 74/479 |
| 5,140,242 A | * 8/1992 | Doran et al. ............ 318/640 |

FOREIGN PATENT DOCUMENTS

| DE | 41 00 686 A | 7/1991 |
| DE | 43 25 450 A | 1/1995 |

OTHER PUBLICATIONS

Y. Ue, N. Sakai, H. Takahashi, Y. Yoshimura, "Spring Stage for 3–dimensional Positioning" taken from Papers of Academic Lectures in Spring 1998 Convention of Japan Society for Precision Engineering.

Y. Yoshimura, "Analysis of Stiffness of Elastic Hinges" taken from Journal of Japan Society for Precision Engineering, vol. 64, No. 11, 1998.

\* cited by examiner

Primary Examiner—Bruce Andrson
Assistant Examiner—Nikita Wells
(74) Attorney, Agent, or Firm—Frishauf, Holtz, Goodman, Langer & Chick, P.C.

(57) ABSTRACT

A stage apparatus comprises a fixed base, a movable table, a pair of elastic portions arranged in both sides of the table along an X axis, a pair of elastic portions arranged in both sides of the table along a Y axis, a pair of actuators for generating displacements for moving the table in a Y direction, a pair of displacement amplifying mechanisms for amplifying displacements of the actuators, a pair of actuators for generating displacements for moving the table in an X direction, and a pair of displacement amplifying mechanisms for amplifying displacements of the actuators. The displacement amplifying mechanism comprises a support member fixed to the fixed base, a first amplifying arm, a first elastic connecting portion for rotatably connecting the first arm to the support member, a second amplifying arm extending in parallel to the first arm and connected to the elastic portion, a second elastic connecting portion for rotatably connecting the second arm to the support member and connecting members for connecting the first arm to the second arm. The actuator extends toward the first arm across the second arm.

54 Claims, 14 Drawing Sheets

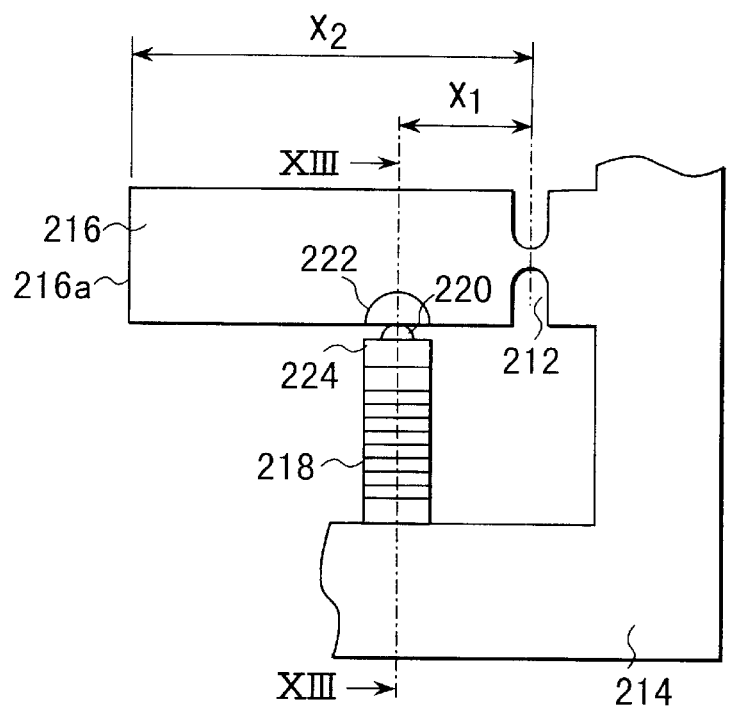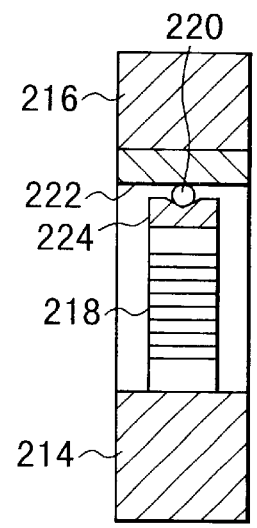
FIG. 12        FIG. 13
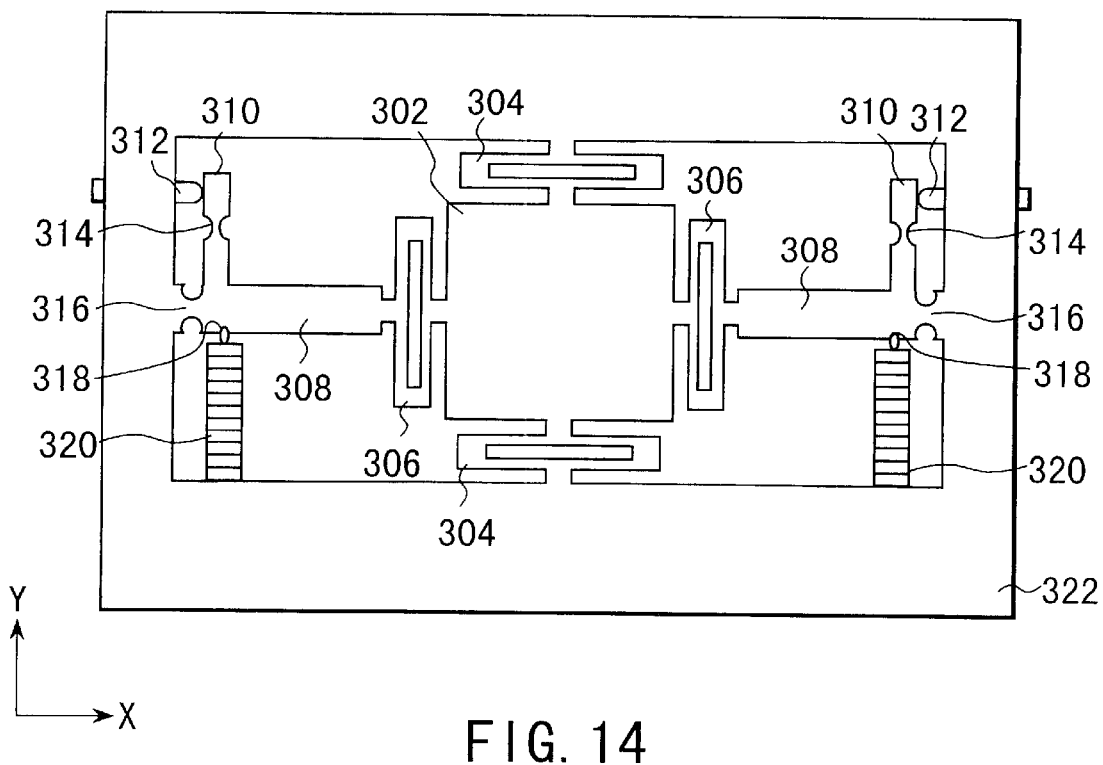
FIG. 14

STAGE APPARATUS INCLUDING DISPLACEMENT AMPLIFYING MECHANISM

BACKGROUND OF THE INVENTION

The present invention relates to a moving apparatus or a stage apparatus used in a scanning mechanism for, for example, a scanning probe microscope, a scanning laser microscope or the like and moving an object to be moved or a movable table at a high positional accuracy.

In an electron microscope, a super precision working machine or the like, in order to move an object to be measured or an object to be worked at a high positional accuracy, a stage apparatus employing an elastic spring guide is usually utilized. Since the elastic spring guide does not have a sliding portion, it is not affected by a play, a friction and an abrasion, so that it is possible to perform a position control at a high accuracy.

Most of the stage apparatus applying the spring guide generally includes a plurality of single-axis drive stages layered each other. However, this structure involves an enlarged size of the stage apparatus.

BRIEF SUMMARY OF THE INVENTION

An object of the present invention is to provide a compact stage apparatus which employs a spring guide excellent in a positioning performance and is suitable for being used under a microscope.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 12 is a schematic view showing a part of a stage apparatus which has further the other more preferable connecting structure between an amplifying arm and an actuator;

FIG. 13 is a cross section taken along the line XIII—XIII in FIG. 12;

FIG. 14 is a schematic view showing a stage apparatus in which a rotational displacement is restricted;

DETAILED DESCRIPTION OF THE INVENTION

[Stage Apparatus Movable in Directions of Two Axes]

Figure 1:
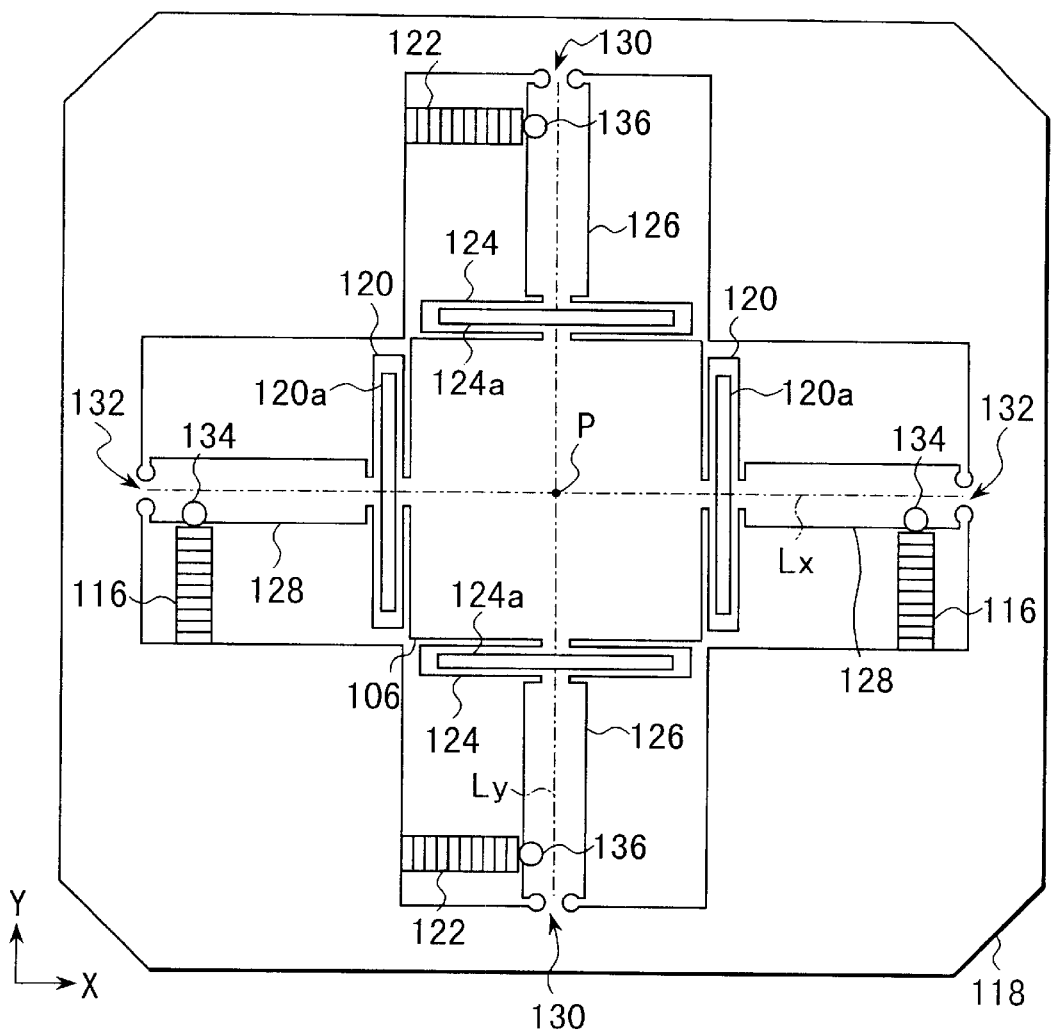
FIG. 1 is a schematic view showing a stage apparatus in which a movable table can move in directions of two axes.

As shown in FIG. 1, a stage apparatus movable in directions of two axes comprises a movable table 106 capable of moving with respect to a fixed base 118, a pair of elastic portions 120 arranged in both sides of the movable table 106 along an X axis of the movable table 106, a pair of elastic portions 124 arranged in both sides of the movable table 106 along a Y axis of the movable table 106, a pair of Y-direction actuators 116 which generates a displacement for moving the movable table 106 in the Y direction, a pair of Y-direction displacement amplifying mechanisms which expand and transmit the displacement of a pair of Y-direction actuators 116 to a pair of elastic portions 120, a pair of X-direction actuators 122 which generate a displacement for moving the movable table 106 in the X direction, and a pair of Y-direction displacement amplifying mechanisms which expand and transmit the displacement of a pair of X-direction actuators 122 to a pair of elastic portions 124.

The elastic portions 120 comprise rectangular springs having hollow portions 120a extending along the Y axis. The rectangular springs 120 respectively extend in symmetrical with an X center line Lx extending through a center P of the movable table 106 in parallel to the X axis. The rectangular springs 120 have a small rigidity against a force applied for moving the movable table 106 in the X direction and have a great rigidity against a force applied for moving the movable table 106 in the Y direction.

The elastic portions 124 comprise rectangular springs having hollow portions 124a extending along the Y axis. The rectangular springs 124 respectively extend in symmetrical with a Y center line Ly extending through a center P of the movable table 106 in parallel to the Y axis. The rectangular springs 124 have a great rigidity against a force applied for moving the movable table 106 in the X direction and have a small rigidity against a force applied for moving the movable table 106 in the Y direction.

Figure 2:
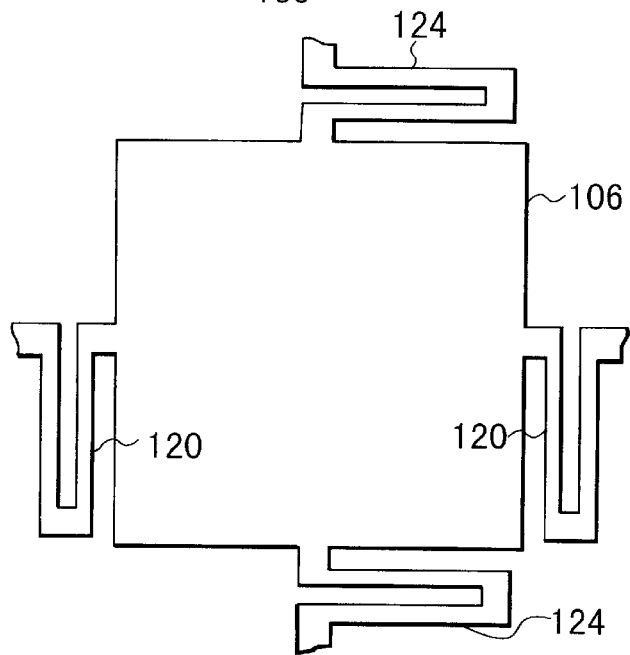
FIG. 2 is a schematic view showing another rectangular spring which may be applied in place of a rectangular spring shown in FIG. 1.

In FIG. 1, the elastic portions 120 and 124 are respectively illustrated as the rectangular springs symmetrically extending with respect to the Y center line Ly and the X center line Lx, however, as shown in FIG. 2, they may be provided with U-shaped springs extending to only one side with respect to the Y center line Ly and the X center line Lx.

As shown in FIG. 1, the X-direction amplifying mechanism comprises a pair of X-direction amplifying arms 126 extending along the Y center line Ly arranged in both sides of the movable table 106. The X-direction amplifying arm 126 has one end integrally connected to the rectangular spring 124, and the other end integrally connected to the fixed base 118 through a hinge portion 130. The hinge portion 130 has a width smaller than that of the X-direction amplifying arm 126, so that the X-direction amplifying arm 126 can be rotatably displaced about the hinge portion 130.

Further, the X-direction driving actuator 122 has one end fixed to the fixed base 118 and extends along the X axis. The X-direction driving actuator 122 rotatably displaces the X-direction amplifying arm 126 about the hinge portion 130 in accordance that the other end thereof presses a side surface of the X-direction amplifying arm 126 in the X direction.

The X-direction driving actuators 122 are preferably arranged at a position close to the hinge portion 130 as near as possible within a mechanically allowable range, respectively. Because arrangement of the X-direction driving actuator 122 closer to the hinge portion 130 allows a displacement of the one end of the X-direction amplifying arm 126 amplified on the basis of a principle of a lever to be larger. Where, the one end indicates a connecting end between the X-direction amplifying arm 126 and the rectangular spring 124, and the displacement indicates also a rotation of the one end of the X-direction amplifying arm 126 about the hinge portion 130.

The Y-direction amplifying mechanism comprises a pair of Y-direction amplifying arms 128 extending along the X center line Lx arranged in both sides of the movable table 106. The Y-direction amplifying arm 128 is structured such that one end thereof is integrally connected to the rectangular spring 120 and the other end thereof is integrally connected to the fixed base 118 through a hinge portion 132. The hinge portion 132 has a width smaller than that of the Y-direction amplifying arm 128, and the Y-direction amplifying arm 128 can be rotatably displaced about the hinge portion 130.

Further, the Y-direction driving actuator 116 has one end fixed to the fixed base 118 and extends along the Y axis. The Y-direction driving actuator 116 rotatably displaces the Y-direction amplifying arm 128 about the hinge portion 132 in accordance that the other end thereof presses a side surface of the Y-direction amplifying arm 128 in the Y direction.

The Y-direction driving actuators 116 are preferably arranged at a position close to the hinge portion 132 as near as possible within a mechanically allowable range, respectively. Because, a displacement (that is, a rotation of the one end of the Y-direction amplifying arm 128 about the hinge portion 132) of the one end of the Y-direction amplifying arm 128 (in particular, a connecting end between the Y-direction amplifying arm 128 and the rectangular spring 120) is amplified on the basis of a principle of a lever and can be made greater than an expansion of the Y-direction driving actuator 116 by arranging the Y-direction driving actuator 116 close to the hinge portion 132.

If a pressing force is directly applied to a side surface of the Y-direction amplifying arm 128 by the Y-direction driving actuator 116, a local stress concentration is generated on the side surface of the Y-direction amplifying arm 128, therefore the side surface of the Y-direction amplifying arm 128 may be locally deformed. Such local deformation prevents an accurate rotating control of the Y-direction amplifying arm 128.

In order to avoid the matter mentioned above, a pin 134 made of a material harder than a material for the Y-direction amplifying arm 128, such as, a hardened material or the like, is press-fitted to a position close to the hinge portion 132 of the Y-direction amplifying arm 128, so that the pressing force of the Y-direction driving actuator 116 is applied to the pin 134. The pressing force applied to the pin 134 is transmitted to the Y-direction amplifying arm 128 in a form of dispersing to a periphery of the pin 134. Accordingly, a local stress concentration is not generated on the side surface of the Y-direction amplifying arm 128.

In the same manner, at a position close to the hinge portion 130 of the X-direction amplifying arm 126, a pin made of a material harder than a material for the X-direction amplifying arm 126, such as, a hardened material or the like, is press-fitted to a position close to the hinge portion 130 of the X-direction amplifying arm 126, so that the pressing force of the X-direction driving actuator 122 is applied to the pin 136.

In the drawings, the pins 134 and 136 respectively employ circular cross sections, however, any shape which prevents a local stress concentration, for example, an oval shape, a semicircular shape and the like, may be applied.

For example, when driving each of the Y-direction driving actuators 116 to expand, an expansion (an expanding force and an expanding amount) is transmitted to the Y-direction amplifying arm 128 through the pin 134.

Since the pressing force of the Y-direction driving actuator 116 applied to the pin 134 is transmitted to the Y-direction amplifying arm 128 in a form of dispersing to a periphery of the pin 134, the Y-direction amplifying arm 128 rotates about the hinge portion 132 at an amount greater than the expansion of the Y-direction driving actuator 116 on the basis of a principle of a lever without generating a local stress concentration on the side surface thereof.

The rotating force is transmitted to the movable table 106 through each of the rectangular springs 120. Since each of the rectangular springs 120 elastically deforms according to the rotation of the Y-direction amplifying arm 128, the rotation of the Y-direction amplifying arm 128 is converted into a linear motion for moving the movable table 106 in the Y direction through the rectangular spring 120 in a parallel manner.

The rectangular spring 120 receives a compression/tensile force in the Y direction, however, since the rectangular spring 120 has a high rigidity against the compression/tensile force, it is elastically deformed at a little amount, but transmits the rotation of the Y-direction amplifying arm 128 to the movable table 106 as it is.

On the other hand, each of the rectangular springs 124 disposed in the both sides along the Y direction of the movable table 106 receives a bending force in the Y direction, however, since the rectangular spring 124 has a low rigidity against the bending force, it is elastically deformed with respect to the rotation of the Y-direction amplifying arm 128 in a smooth manner. One of the rectangular springs 124 is to have a hollow portion 124a expanded and the other of the rectangular springs 124 is to have a hollow portion 124a compressed.

As a result, the movable table 106 smoothly moves in the Y direction within the XY plane in a parallel manner without sinking at an accurate amount corresponding to the rotation of the Y-direction amplifying arm 128.

On the other hand, when driving and expanding each of the X-direction driving actuators 122, an expansion (an expanding force and an expanding amount) is transmitted to the X-direction amplifying arm 126 through the pin 136.

Since the pressing force of the X-direction driving actuator 122 applied to the pin 136 is transmitted to the X-direction amplifying arm 126 in a form of dispersing to a periphery of the pin 136, the X-direction amplifying arm 126 rotates about the hinge portion 130 at an amount greater than the expansion of the X-direction driving actuator 122 on the basis of a principle of a lever without generating a local stress concentration on the side surface thereof.

The rotating force is transmitted to the movable table 106 through each of the rectangular springs 124. Since each of the rectangular springs 124 elastically deforms according to the rotation of the X-direction amplifying arm 126, the rotation of the X-direction amplifying arm 126 is converted into a linear motion for moving the movable table 106 in the X direction through the rectangular spring 124 in a parallel manner.

The rectangular spring 124 receives a compression tensile force in the X direction, however, since the rectangular spring 124 has a high rigidity against the compression/tensile force, it is elastically deformed at a little amount, but transmits the rotation of the X-direction amplifying arm 126 to the movable table 106 as it is.

On the other hand, each of the rectangular springs 120 disposed in the both sides along the X direction of the movable table 106 receives a bending force in the X direction, however, since the rectangular spring 120 has a low rigidity against the bending force, it is elastically deformed with respect to the rotation of the X-direction amplifying arm 126 in a smooth manner. One of the rectangular springs 120 is to have a hollow portion 120a expanded and the other of the rectangular springs 120 is to have a hollow portion 120a compressed.

As a result, the movable table 106 smoothly moves in the X direction within the XY plane in a parallel manner without sinking at an accurate amount corresponding to the rotation of the X-direction amplifying arm 126.

In accordance with the stage apparatus, the movable table is positioned in a relatively wide range at a high accuracy.

[Stage Apparatus Movable in Directions of Three Axes]

Next, a stage apparatus movable in directions of three axes will be described below with reference to FIGS. 3 to 5. In the following description, elements similar to those of the stage apparatus mentioned above are indicated with the same reference numerals, and a description thereof will be omitted.

The stage apparatus is improved on the stage apparatus mentioned above so as to move the movable table 106 in directions of three axes, that is, X, Y and Z directions.

Figure 3:
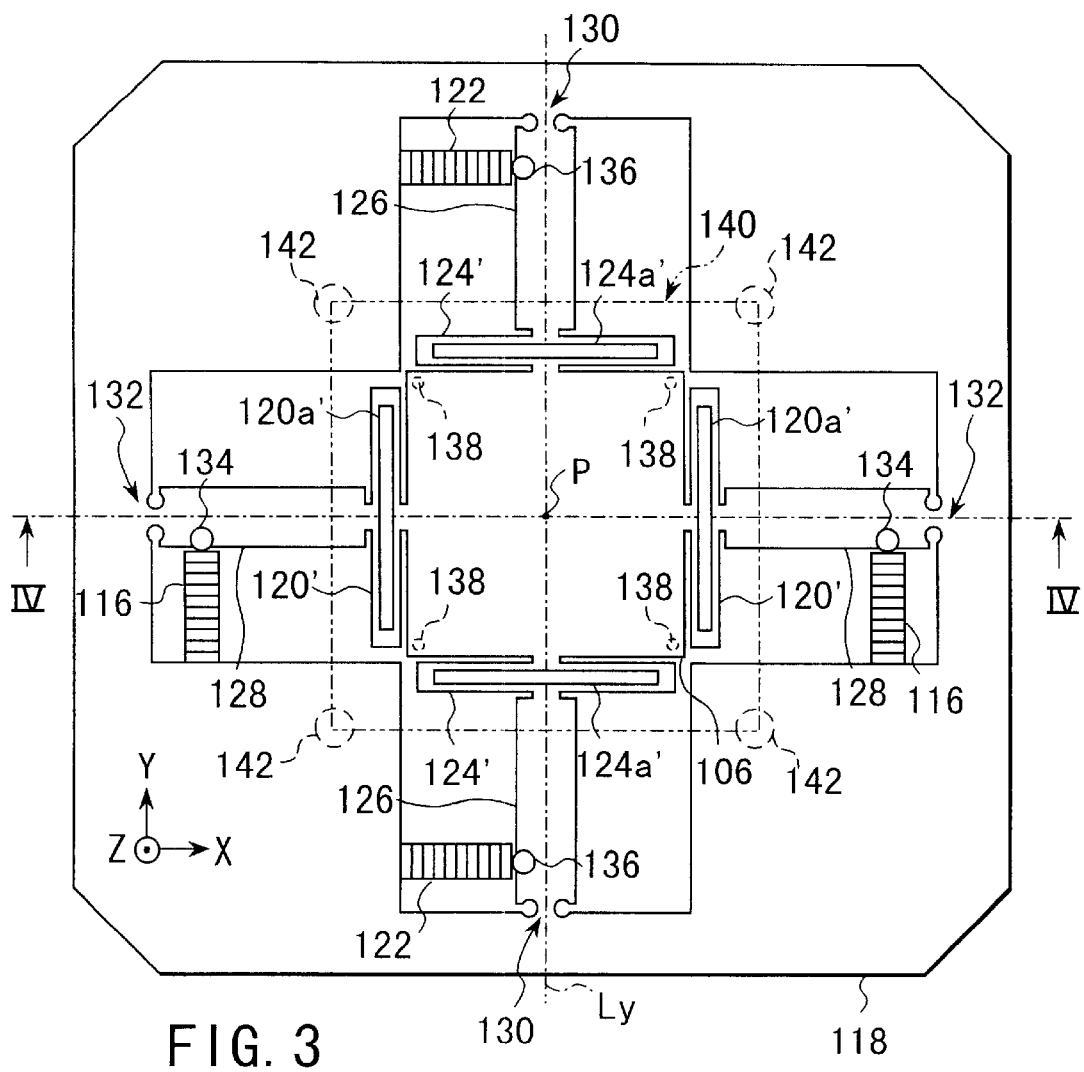
FIG. 3 is a schematic view showing a stage apparatus in which a movable table can move in directions of three axes.
Figure 4:
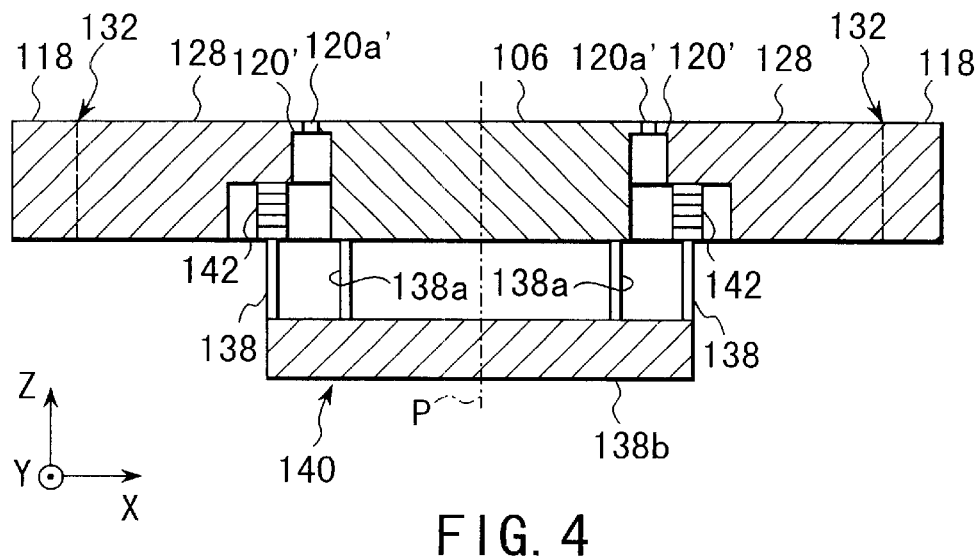
FIG. 4 is a cross section taken along the line IV—IV in FIG. 3.

As shown in FIGS. 3 and 4, an elastic portion provided in the periphery of the movable table 106 employs thin rectangular springs 120' and 124' formed thinner than that of the X-direction amplifying arms 126, the Y-direction amplifying arms 128 or the movable table 106 in place of the rectangular springs 120 and 124 (refer to FIG. 1).

Each of the thin rectangular spring 120' is provided with a hollow portion 120a' extending along the Y direction. In this case, the thin rectangular spring 120' is, in other words, structured such that a rod-shaped spring is bent in such a manner as to form the hollow portion 120a'.

Further, the thin rectangular spring 120' has a low rigidity against a bending force applied for moving the movable table 106 in the X direction and the z direction and has a high rigidity against a compression/tensile force applied for moving the movable table 106 in the Y direction.

Each of the thin rectangular spring 124' is provided with a hollow portion 124a' extending along the X direction. The thin rectangular spring 124' is, in other words, structured such that a rod-shaped spring is bent in such a manner as to form the hollow portion 124a'.

Further, the thin rectangular spring 124' has a low rigidity against a bending force applied for moving the movable table 106 in the Y direction and the Z direction and has a high rigidity against a compression/tensile force applied for moving the movable table 106 in the X direction.

Since the movable table 106 is always under a state of being elastically supported at the same position by applying the thin rectangular springs 120' and 124', the thin rectangular springs 120' and 124' are elastically deformed and smoothly bent in the same manner, respectively in the case of applying the pressing force in the Z direction to the movable table 106, so that the movable table 106 is accurately and smoothly moved in the z direction in a parallel manner.

To the contrary, in the case of applying the pressing force in the X direction and the Y direction to the movable table 106, since the thin rectangular springs 120' and 124' are elastically deformed and smoothly bent, the movable table 106 is smoothly moved in the X direction and the Y direction.

In order to prevent the movable table 106 from sinking in the Z direction together with the movement in the X direction and the Y direction, elastic members 138 are arranged at four corners in symmetrical with respect to the center P of the movable table 106.

Each of the elastic member 138 comprises the thin U-shaped spring having a hollow portion 138a extending along the Z direction. The thin U-shaped spring 138 is, in other words, structured such as to bend the rod-shaped spring for forming the hollow portion 138a.

Each of the thin U-shaped springs 138 has a low rigidity against a bending force applied for moving the movable table 106 in the X direction and the Y direction and has a high rigidity against a compression/tensile force applied for moving the movable table 106 in the Z direction.

Further, each of the thin U-shaped springs 138 is structured such that one end thereof is connected to the movable table 106 and the other end is connected to the fixed base 118 through a Z direction driving actuator 142 mentioned below, and the movable table 106 is elastically supported to the fixed base 118 through the thin U-shaped spring 138. The lower end portions 138b of the thin U-shaped spring 138 are in a free state without being fixed to the other portions and are connected to each other through one connecting member 140.

The fixed base 118 is connected to one end of each of the Z direction driving actuators 142 and the other end of each of the Z direction driving actuator is fixed to the movable table 106 through the thin U-shaped spring 138.

Figure 5:
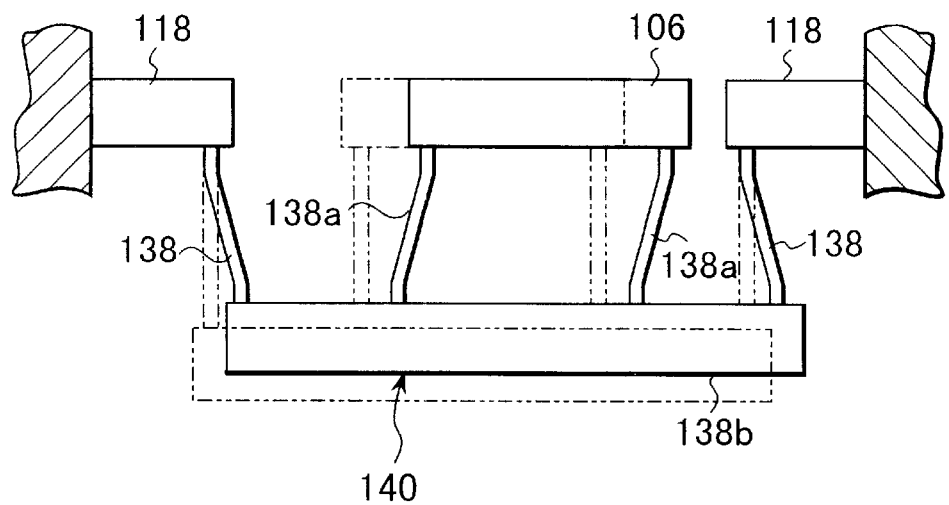
FIG. 5 is a schematic view showing a motion of a thin U-shaped spring together with a motion in XY directions of the movable table in the stage apparatus shown in FIG. 3.

In accordance with this improved structure, when moving the movable table 106 in the X direction or the Y direction, the hollow portion 138a of one of the thin U-shaped springs 138 is expanded and the hollow portion 138a of the other of the thin U-shaped springs 138 is simultaneously compressed as shown by a solid line in FIG. 5, whereby the lower end portion 138b is pulled up to a position shown by a solid line from a position shown by a two dot chain line in FIG. 5 in the direction of the movable table 106 in correspondence to a bending amount of the thin U-shaped spring 138, so that the movable table 106 always moves in a parallel manner within the XY plane without sinking.

Further, the Z direction driving actuators 142, for example, piezoelectric actuators are respectively fixed to the fixed bases 118 disposed near four corners of the movable table 106, and can press the other ends of the thin U-shaped springs 138.

In this case, when amplifying the Z-direction driving actuators 142 and applying the pressing force to the other ends of the thin U-shaped springs 138, the thin U-shaped springs 138 receive the compression/tensile force in the Z direction, however, since they have a high rigidity against the compression/tensile force, the expansion of the Z-direction driving actuators 142 can be transmitted to the movable table 106 as it is without elastically deforming.

At this time, the thin rectangular springs 120' and 124' in the periphery of the movable table 106 respectively receive the bending force in the Z direction, however, since they have a low rigidity against the bending force, they are elastically deformed in a smooth manner in correspondence to the expansion applied to the movable table 106.

As a result, the movable table 106 smoothly moves in a parallel manner at an accurate amount corresponding to the expansion of the Z-direction driving actuator 142.

In accordance with the stage apparatus, the movable table can be positioned in three dimensional directions at a high accuracy.

[More Preferable Connecting Structure Between Amplifying Arm and Actuator]

Hereinafter, a description will be given of a stage apparatus having a more preferable connecting structure between the amplifying arm and the actuator with reference to the accompanying drawings showing a part thereof.

Figure 6:
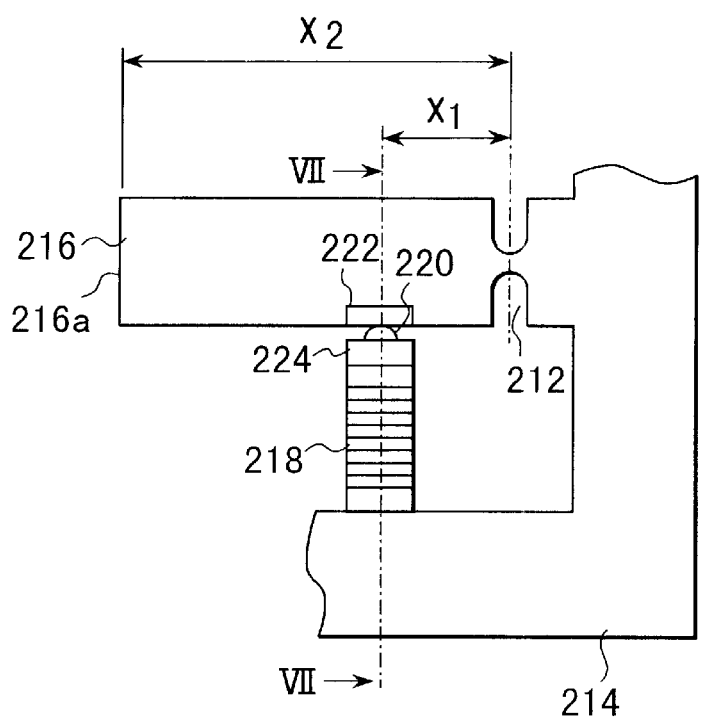
FIG. 6 is a schematic view showing a part of a stage apparatus having a more preferable connecting structure between an amplifying arm and an actuator.
Figure 7:
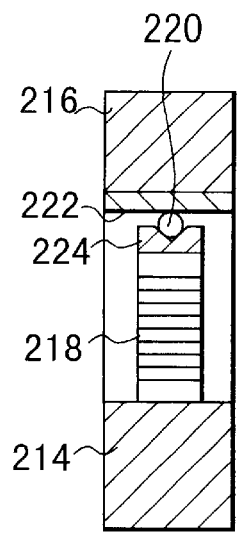
FIG. 7 is a cross section taken along the line VII—VII in FIG. 6.

The stage apparatus having the more preferable connecting structure is, as shown in FIGS. 6 and 7, provided with an amplifying arm 216 integrally connected to a fixed base 214 through a hinge portion 212, for example, an arm made of an aluminum alloy, an actuator 218 for applying a predetermined pressing force to the amplifying arm, for example, a piezoelectric actuator, a pressing member 220 for transmitting a pressing force of the actuator 218 to the amplifying arm 216, and a receiving member 222 arranged in the amplifying arm 216 in such a manner as to be brought into contact with the pressing member 220 and dispersing the pressing force of the actuator 218 transmitted through the pressing member 220 so as to apply to the amplifying arm 216.

The pressing member 220 comprises, for example, a rigid ball made of a material harder than the amplifying arm 216, such as a hardened material, and the rigid ball is held on a holding body 224 arranged at a displacing end of the actuator 218.

The receiving member 222 comprises, for example, a rectangular chip made of a material harder than the amplifying arm 216, such as the hardened material, and the rectangular chip is installed in a side edge portion of the amplifying arm 216 in a partly exposing manner so that a flat portion thereof is brought into contact with the pressing member or rigid ball 220.

The actuator 218 displaces the displacing end by contraction/expansion, which presses the pressing member or rigid ball 220 to the receiving member 222, so that the actuator 218 applies a desired pressing force to the amplifying arm 216.

The amplifying arm 216 is elastically supported to the fixed base 214 through the hinge portion 212, and is always elastically held at a fixed position, that is, an initial position in a state that the pressing force is not applied from the actuator 218.

For example, when expanding the actuator 218 so as to press the pressing member 220 to the receiving member 222 by a predetermined pressing force, the pressing force is applied to the amplifying arm 216 in a dispersing form by the receiving member 222. The pressing force transmitted to the receiving member 222 from the actuator 218 through the pressing member 220 is applied to the amplifying arm 216 while amplifying from the rectangular contact surface of the receiving member 222 with respect to the amplifying arm 216, for example, in a radially dispersing form. Accordingly, it is preferable to increase the contact area of the receiving member 222 with respect to the amplifying arm 216, and a dispersing degree of the pressing force can be increased.

As a result, it is possible to accurately rotate the amplifying arm 216 about the hinge portion at an amount corresponding to the displacement of the actuator 218 without generating a stress concentration and a local deformation with respect to the portion to which the pressing force is applied. Then, thereafter, when compressing the actuator 218, the amplifying arm 216 rotates in a direction of the initial position due to the elastic force applied to the amplifying arm 216. Accordingly, it is possible to accurately position the amplifying arm 216 to a desired position by contraction/expansion of the actuator 218.

Further, since the flat portion of the rectangular receiving member 222 is brought into contact with the pressing member or rigid ball 220, whereby no unnecessary bending moment is applied to the actuator 218 during the contraction/expansion.

With further explaining, the receiving member 222 and the pressing member 220 are substantially point-contacted and no force except the contact point is applied from the pressing member 220, so that no unnecessary bending moment is applied to the actuator 218. In the other concrete embodiments, the description about the same operating portions will be omitted.

When setting a displacement of the actuator 218 to $Y_1$, a displacement of the rotating end 216a of the amplifying arm 216 to $Y_2$, a distance between a position at which the pressing member 220 is brought into contact with the receiving member 222 and the hinge 212 to $X_1$, and a distance between the hinge portion 212 and the rotating end 216a of the amplifying arm 216 to $X_2$, the following relationship is established.

$$Y_2 = (X_2/X_1) \cdot \quad (1)$$

Accordingly, it is possible to various change the rotation of the amplifying arm 216 by selectively changing the arrangement of the actuator 218. For example, in the case that it is desired to increase the displacement $Y_2$ of the rotating end 216a of the amplifying arm 216, it is sufficient to move the actuator 218 close to the hinge portion 212. Because the displacement of the rotating end 216a of the amplifying arm 216 is amplified on the basis of a principle of a lever by arranging the actuator 218 close to t he hinge portion 212 so as to be made greater than the expansion of the actuator 218.

Further, since the pressing member 220 is the rigid ball and the receiving member 222 is the flat portion, it is advantageous in the following views. That is, at a time of mounting the actuator 218 and the pressing member 220, it is sufficient to mount so that the rigid ball is positioned on the flat portion of the receiving portion 222, whereby the apparatus can be easily assembled.

Next, a description will be given of the other stage apparatus having a more preferable connecting structure with reference to FIGS. 8 and 9. In the following description, the same reference numerals are attached to the same elements as those of the apparatus mentioned above, and an explanation thereof will be omitted.

Figure 8:
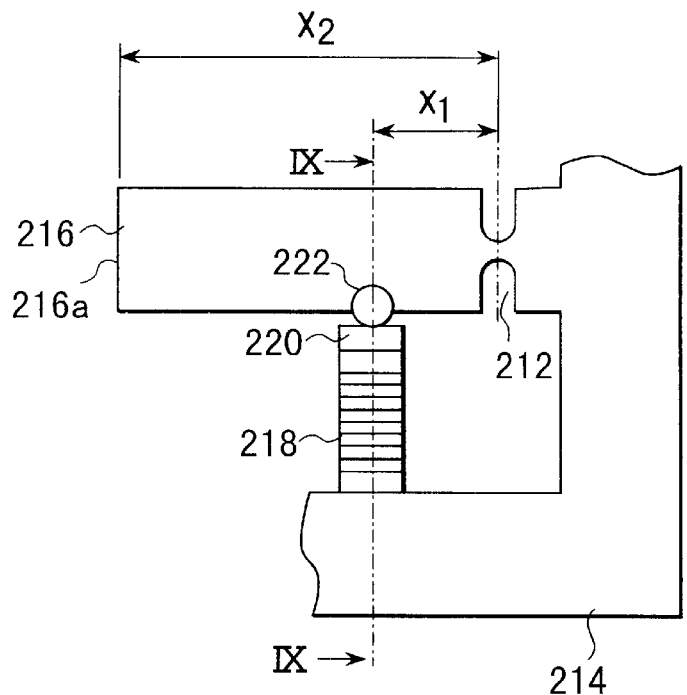
FIG. 8 is a schematic view showing a part of a stage apparatus which has another more preferable connecting structure between an amplifying arm and an actuator.
Figure 9:
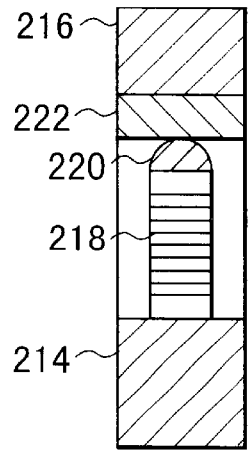
FIG. 9 is a cross section taken along the line IX—IX in FIG. 8.

As shown in FIGS. 8 and 9, a semi-cylindrical or cylindrical pressing member 220 formed by a material harder than the amplifying arm 216, for example, a hardened material is employed, and the pressing member 220 is mounted to the displacing end of the actuator 218. In these drawings, the semi-cylindrical pressing member 220 is exemplified as an example thereof.

Further, a semi-cylindrical or cylindrical receiving member 222 formed by a material harder than the amplifying arm 216, for example, a hardened material is employed, and the receiving member 222 is installed in the side edge portion of the amplifying arm 216 in a partly exposing manner in such a manner as to be brought into contact with the pressing member 220 with crossing at about 90 degrees. In these drawings, the cylindrical receiving member 222 is exemplified as an example thereof.

Since the contact area of the receiving member 222 with respect to the amplifying arm 216 is expanded in a cylindrical shape, the pressing force transmitted from the actuator 218 to the receiving member 222 through the pressing member 220 is applied to the amplifying arm 216 while amplifying from the cylindrical contact surface of the receiving member 222 with respect to the amplifying arm 216, for example, in a radially dispersing manner.

As a result, it is possible to accurately rotate the amplifying arm 216 about the hinge portion at an amount corresponding to the displacement of the actuator 218 without generating a stress concentration and a local deformation with respect to the portion to which the pressing force is applied. Further, no unnecessary bending moment is applied to the actuator 218 during the contraction/expansion since the cylindrical receiving member 222 and the semi-cylindrical pressing member 220 are brought into contact with each other with relatively crossing them at about 90 degrees.

Further, since the pressing member 220 and the receiving member 222 are formed in a semi-cylindrical shape or a cylindrical shape and are brought into contact with each other with crossing at about 90 degrees, they are advantageous in the following points. That is, since the actuator 218 and the pressing member 220 can be positioned at a width of the cylindrical or semi-cylindrical side surface of the pressing member 220 and the receiving member 222 at a time of mounting the actuator 218 and the pressing member 220, the apparatus can be easily assembled.

Figure 10:
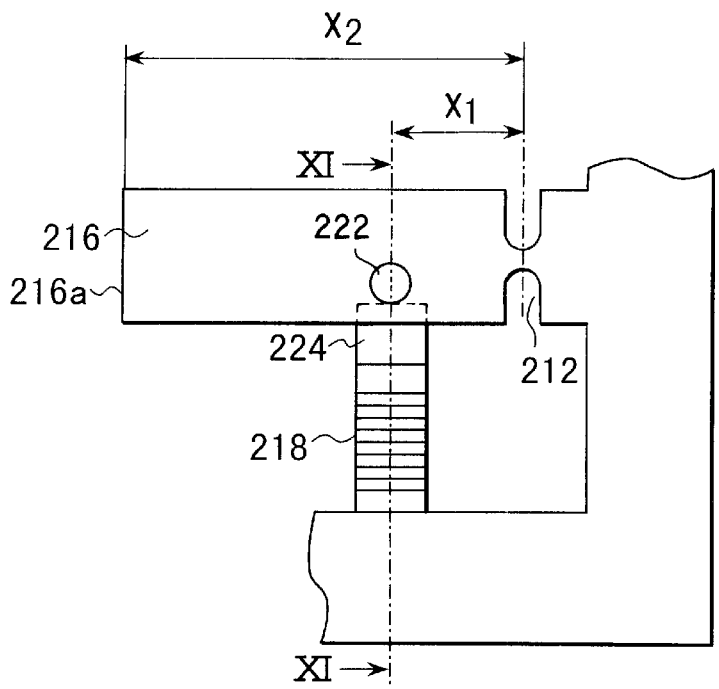
FIG. 10 is a schematic view showing a part of a stage apparatus having the other more preferable connecting structure between an amplifying arm and an actuator.
Figure 11:
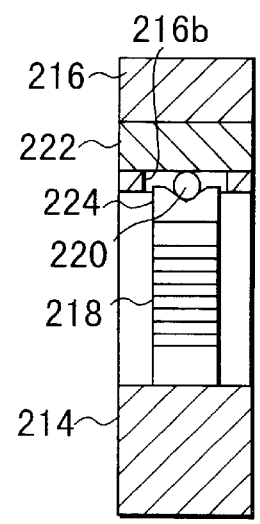
FIG. 11 is a cross section taken along the line XI—XI in FIG. 10.

Next, a description is given of further the other stage apparatus having a more preferable connecting structure with reference to FIGS. 10 and 11. In the following description, the same reference numerals are attached to the same elements as those of the apparatus mentioned above, and an explanation thereof will be omitted.

As shown in FIGS. 10 and 11, a cylindrical pressing member 220 formed by a material harder than the amplifying arm 216, for example, a hardened material is employed, and the pressing member 220 is held on a holding body 224 provided in the displacing end of the actuator 218.

Further, a cylindrical receiving member 222 formed by a material harder than the amplifying arm 216, for example, a hardened material is employed, and the receiving member 222 is inserted into a hole pierced in the amplifying arm 216 in such a manner as to cross to the pressing member 220 at about 90 degrees and is installed in an inner portion of the amplifying arm 216.

Since the receiving member 222 is installed in the inner portion of the amplifying arm 216 in the manner mentioned above, an opening portion 216b (refer to FIG. 11) for bringing the pressing member 220 into contact with the receiving member 222 is formed in the amplifying arm 216.

In accordance with the structure mentioned above, the cylindrical receiving member 222 is completely installed in the inner portion of the amplifying arm 216. Accordingly, since all the peripheral surface of the receiving member 222 is brought into contact with the amplifying arm 216 and the contact area of the receiving member 222 with respect to the amplifying arm 216 is most expanded in a cylindrical shape, the pressing force transmitted to the receiving member 222 from the actuator 218 through the pressing member 220 is applied to the amplifying arm 216 from the cylindrical contact surface of the receiving member 222 against the amplifying arm 216, for example, in a form of radially dispersing in a circumferential direction.

As a result, it is possible to accurately rotate the amplifying arm 216 about the hinge portion at an amount corresponding to the displacement of the actuator 218 without generating a stress concentration and a local deformation with respect to the portion to which the pressing force is applied. Further, no unnecessary bending moment is applied to the actuator 218 during the contraction/expansion since the cylindrical receiving member 222 and the semi-cylindrical pressing member 220 are brought into contact with each other with relatively crossing them at about 90 degrees.

Next, a description is given of further the other stage apparatus having a more preferable connecting structure with reference to FIGS. 12 and 13. In the following description, the same reference numerals are attached to the same elements as those of the apparatus mentioned above, and an explanation thereof will be omitted.

As shown in FIGS. 12 and 13, a rigid ball formed by a material harder than the amplifying arm 216 (for example, a hardened material) is employed, and the rigid ball is held on a holding body 224 provided in the displacing end of the actuator 218.

Further, a semi-cylindrical receiving member 222 formed by a material harder than the amplifying arm 216 (for example, a hardened material) is employed, and the receiving member 222 is installed in a side edge portion of the amplifying arm 216 in a partly exposing manner in such a manner that the flat portion is brought into contact with the pressing member or rigid ball 220.

In accordance with the structure mentioned above, since the contact area of the receiving member 222 with respect to the amplifying arm 216 is expanded in a semi-cylindrical shape, the pressing force transmitted to the receiving member 222 from the actuator 218 through the pressing member 220 is applied to the amplifying arm 216 from the semi-cylindrical contact surface of the receiving member 222 against the amplifying arm 216, for example, in a form of radially dispersing.

As a result, it is possible to accurately rotate the amplifying arm 216 about the hinge portion at an amount corresponding to the displacement of the actuator 218 without generating a stress concentration and a local deformation with respect to the portion to which the pressing force is applied. Further, no unnecessary bending moment is applied to the actuator 218 during the contraction/expansion since the flat portion of the semi-cylindrical receiving member 222 is brought into contact with the pressing member or rigid ball 220.

More preferable connecting structures are not limited to the structures described above with reference to the drawings, and any structure may be employed as far as it is possible to disperse the pressing force of the actuator 218 so as to apply to the amplifying arm 216. For example, the structure may be made such that a spherical receiving member 222 is installed in the amplifying arm 216, and a pressing member 220 structured such that a flat portion is brought into contact with the spherical receiving member 222 is provided at the displacing end of the actuator 218.

[Stage Apparatus in which Rotational Displacement is Restricted]

Next, a description is given of a stage apparatus in which a rotational displacement is restricted with reference to FIG. 14. The stage apparatus corresponds to a stage apparatus capable of moving a movable table in a direction of one axis, that is, a Y-axis direction.

As shown in FIG. 14, the apparatus comprises a movable table 302, a pair of rectangular springs 304, a pair of rectangular springs 306, a pair of amplifying arm 308 and a fixed base 322. The movable table 302 is supported by the two pair of rectangular springs 304 and 306 each having a slit. The rectangular springs 304 are directly connected to a fixed base 322 and the rectangular springs 306 are connected to the fixed base 322 through the amplifying arms 308, respectively. The amplifying arms 308 have arc notches 316 near portions connecting to the fixed base 322 and can rotate about the notches, respectively.

The apparatus further comprises a pair of piezoelectric actuators 320. The piezoelectric actuators 320 have ends fixed to the fixed base 322 and the other ends brought into contact with pins 318 installed near the arc notches 316 of the amplifying arms 308, respectively.

Further, the amplifying arms 308 have arms 310 perpendicularly extending from opposite sides of the pins 318 near the arc notches 316, respectively. The arms 310 have arc notches 314 near centers thereof and feeding screws 312 for pressing front portions of the arc notches 314 are provided in the fixed base 322, respectively.

The elements mentioned above are all arranged in symmetrical with a driving axis (a Y axis).

The movable table 302, the rectangular springs 304 and 306, the amplifying arms 308, the arms 310 and the fixed base 322 are integrally produced by suitably cutting a single metal block.

The movable table 302 is driven by applying a voltage to the piezoelectric actuators 320. The piezoelectric actuators 320 contract/expand in accordance of an application of a voltage, and press the amplifying arms 308 through the pins 318 in the Y direction. Accordingly, the amplifying arms 308 rotate about the arc notches 316.

In order to prevent the amplifying arms 308 from absorbing displacements at local portions pressed by the piezoelectric actuators 320, the pins 318 are made of a material harder than a material forming the amplifying arms 308. Since positions at which the piezoelectric actuators 320 press the amplifying arms 308 are near the arc notches 316 serving as fulcrums for rotation, and the movable table 302 is apart from the arc notches 316 as fulcrums, the displacements of the piezoelectric actuators 320 are amplified in accordance with an amplifying principle and transmitted to the movable table 302.

The piezoelectric actuators 320 generate dispersion in the displacement due to an individual difference with respect to the same voltage application. For example, in a drive of the piezoelectric actuators 320 for moving the movable table 302, if a displacement of the right one of the piezoelectric actuators 320 is larger than a displacement of the left one of the piezoelectric actuators 320, the movable table 302 is rotated in a leftward direction. Further, the movable table 302 is also rotated in accordance with a difference in a Y-direction rigidity between the right and left rectangular springs 306 caused by a working error or the like. This kind of rotational displacement is an undesireble motion for linear moving of the movable table 302.

Figure 15:
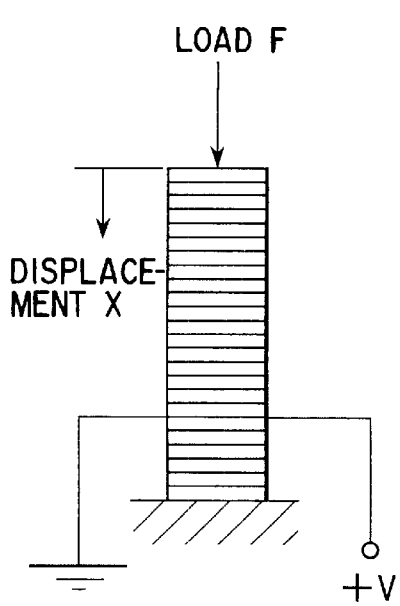
FIG. 15 is a schematic view showing a state in which a load F in a direction of compressing a piezoelectric actuator displaced due to an application of a voltage is applied to the piezoelectric actuator.
Figure 16:
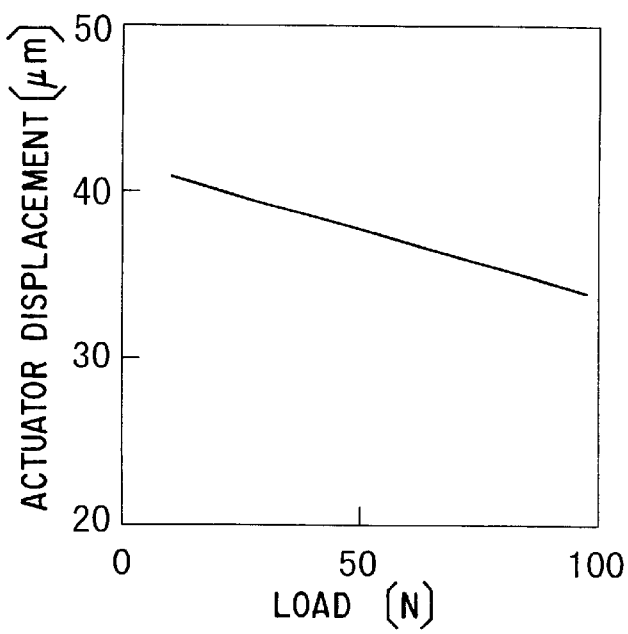
FIG. 16 is a graph showing a relationship between a load F and a displacement X in the piezoelectric actuator shown in FIG. 15.

FIG. 15 shows a state that a load F in a direction of pressing the piezoelectric actuator which displaces due to the application of the voltage is applied to the piezoelectric actuator, and FIG. 16 is a graph showing a relationship between the load F and a displacement X in the piezoelectric actuator under the above state. In accordance with the graph, it is known that the displacement of the piezoelectric actuator can be adjusted by applying a suitable load F to the piezoelectric actuator.

In FIG. 14, the arc notch 314 formed in the arm 310 serves as a spring. When feeding the feeding screw 312, the arm 310 is pressed and the arc notch 314 is deflected. The load F deflecting the arc notch 314 simultaneously is also applied to the piezoelectric actuator 320 in a direction of compressing this. By suitably adjusting a feeding amount of the feeding screw 312, the arc notch 314 serves as a variable pre-pressurizing spring on the basis of the load pressing the arm 310 so as to adjust the load F applied to the piezoelectric actuator 320. In other words, the arm 310 and the feeding screw 312 constitute a load adjusting mechanism which adjusts the load F for deflecting the arc notch 314, and it is possible to suitably adjust the displacement of the piezoelectric actuator 320 by adjusting the load adjusting mechanism. The displacement of the piezoelectric actuator 320 may be monitored by the connecting portion between the movable table 302 and the rectangular spring 306. Because the displacement of the piezoelectric actuator is amplified and the dispersion of the lateral displacement including an influence of the dispersion of the Y-direction deflection resistance of the rectangular spring 306 can be recognized.

In the manner mentioned above, it is possible to accurately feed the movable table 302 by repeating the application and the shut-off of the voltage in the piezoelectric actuator 320 and adjusting the feeding screw 312 so that the right and left displacements are equal to each other.

Figure 17:
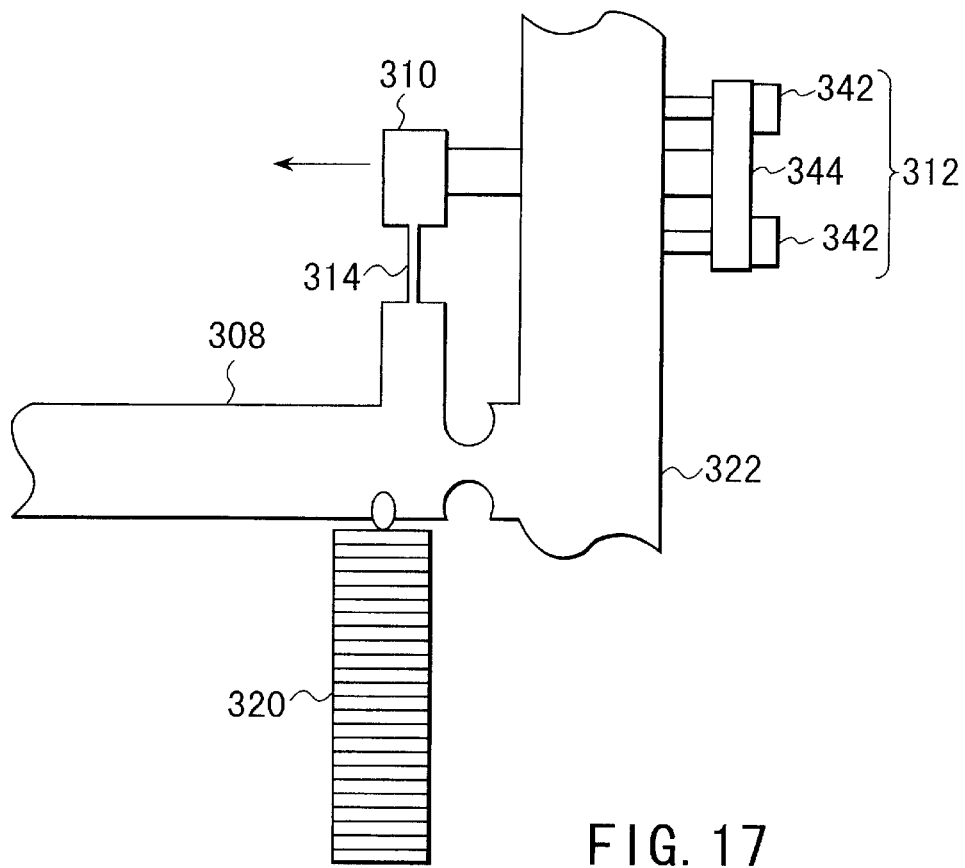
FIG. 17 is a schematic view showing a detailed structure of a feeding screw schematically shown in FIG. 14.

The feeding screw 312 is schematically illustrated in FIG. 14, however, actually has a pressing shaft 344 and a screw 342 as shown in FIG. 17. The pressing shaft 344 is inserted into the fixed base 322 in such a manner as to freely slid in a direction of an arrow. Further, a front end of the pressing shaft 344 is fixed to the arm 310 by a bonding or the like.

The pressing shaft 344 is fed in a direction of pressing the arm 310 by feeding the screw 342 to the fixed base 322. Since the front end of the pressing shaft 344 and the arm 310 are fixed, a fine slippage is not generated between the pressing shaft 344 and the arm 310 and an adjustment error due to a slack of the feeding screw 312 is not generated.

The feeding screw 312 in the load adjusting mechanism may be replaced by the other elements as far as it can apply an adjustable load to the arm 310. For example, the same effect can be also obtained by employing a piezoelectric member structured such that one end is fixed to the fixed base 322 and the other end is brought into contact with the arm 310. Further, in order to save a manual adjustment, a picomotor (manufactured by New Focus Co., Ltd. in USA) may be employed for a part of the feeding screw 312.

The picomotor has two rod-shaped holding members arranged in parallel to each other and a piezoelectric element connecting the holding members. A feeding screw is gripped between the two holding members.

In this state, when the piezoelectric element is under a static condition, the feeding screw is held between the two holding members and is at a standstill. By driving the piezoelectric element, the two holding members are moved in opposite directions, respectively, along a longitudinal direction of the holding members, and the feeding screw is rotated. As a result, the feeding screw moves in a longitudinal direction thereof.

Arc notched springs, the arc notches 314, used for adjusting the load are integrally formed with the movable table 302, the rectangular springs 304 and 306, the amplifying arms 308 and the fixed base 322 together with the arms 310. This structure reduces the number of parts, make the apparatus compact and make a construction easy. Further, since there is no frictional sliding portion, a reproducibility of a motion can be improved.

The load adjusting spring may employ various types as far as it has a spring characteristic such as a plate spring or a coil spring in addition to the arc notch shape.

Figure 18:
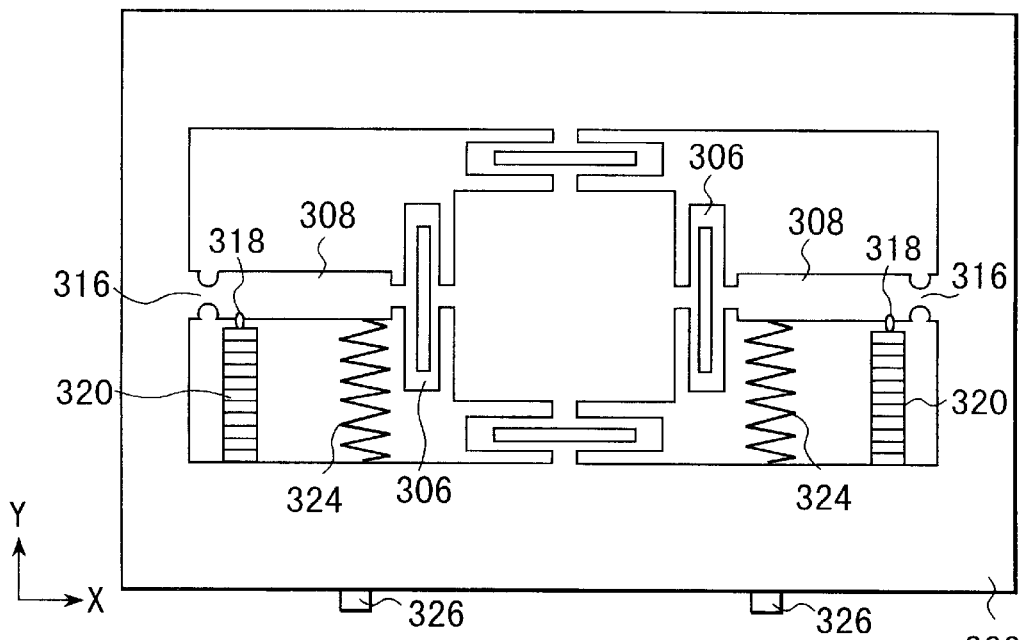
FIG. 18 is a schematic view showing a stage apparatus employing a coil spring in place of an arm having a spring characteristic shown in FIG. 14.

FIG. 18 shows a modified embodiment of the stage apparatus shown in FIG. 14. In FIG. 18, the same reference numerals are attached to the same elements as those shown in FIG. 14.

As shown in FIG. 18, the amplifying arm 308 does not have the arm 310 provided with the arc notch 314 (shown in FIG. 14) and one end of the coil spring 324 is connected to the same side as the pin 318. The other end of the coil spring 324 is connected to the feeding screw 326 provided in the fixed base 322.

The coil spring 324 is connected to the amplifying arm 308 near the rectangular spring 306 and pulls the amplifying arm 308 to the feeding screw 326. Accordingly, the piezoelectric actuator 320 receives a load in a compressing direction. The load applied to the piezoelectric actuator 320 can be changed by operating the feeding screw 326 so as to adjust the extension of the coil spring 324.

Accordingly, the movable table 302 linearly displaces in the Y direction by uniformly adjusting the displacements of the right and left piezoelectric actuators by means of the feeding screw 326.

The stage apparatus using the coil spring in accordance with the modified embodiment has an advantage that a design of the apparatus and an adjustment of the displacement can be easily performed since the coil spring 324 has a linear relationship between an extension and a restoring force.

Figure 19:
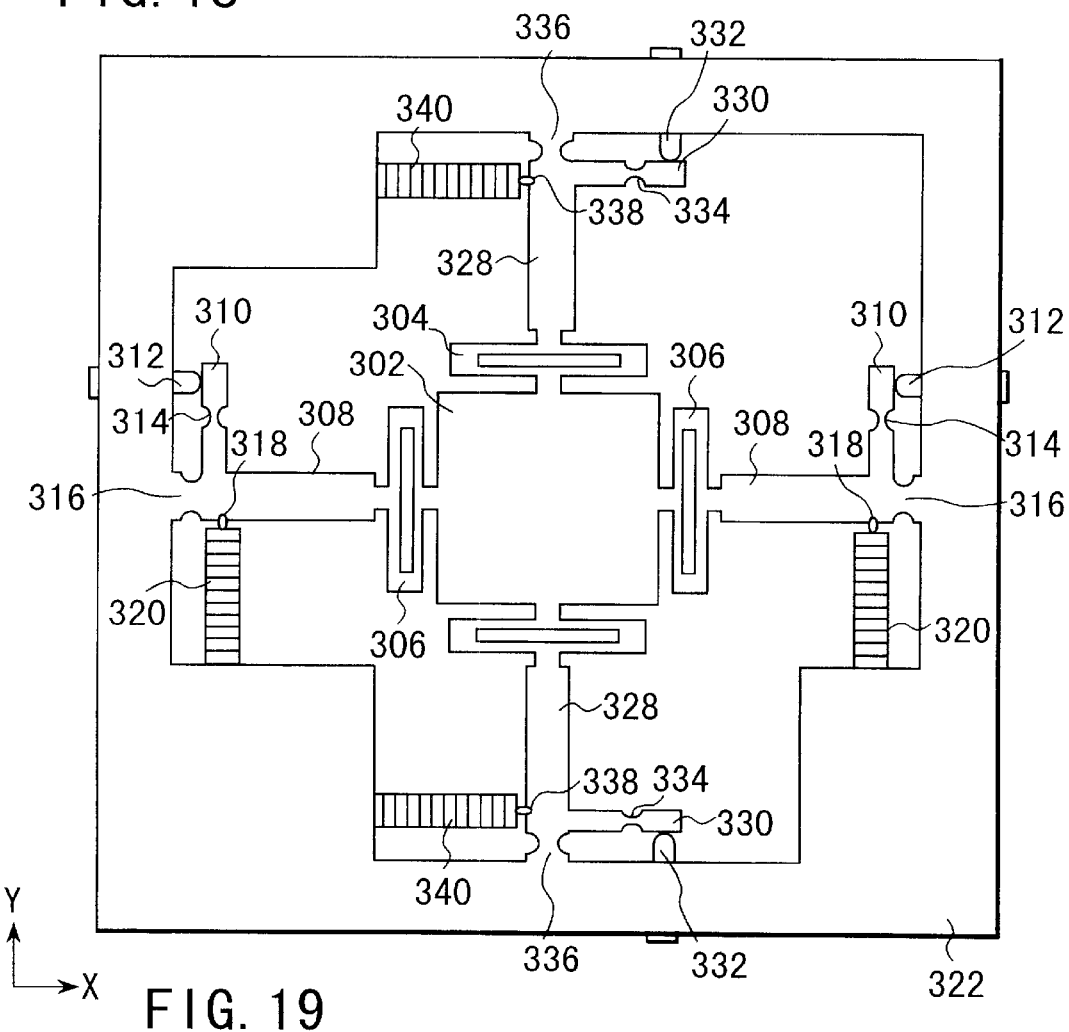
FIG. 19 is a schematic view showing another stage apparatus in which a rotational displacement is restricted.

Next, a description will be given of the other stage apparatus in which a rotational displacement is restricted with reference to FIG. 19. The stage apparatus corresponds to a stage apparatus in which a movable table can be moved in directions of two axes, that is, an X-axis direction and a Y-axis direction. In FIG. 19, the same reference numerals are attached to the same elements as those shown in FIG. 14.

As is known from the drawing, the stage apparatus is structured such that the same structure as the driving mechanism in the Y-axis direction shown in FIG. 14 is added to a driving mechanism in the X-direction. Accordingly, structures of the rectangular springs 306, the amplifying arms 308, the arms 310, the feeding screws 312 and the piezoelectric actuators 320 are absolutely the same as that of the apparatus shown in FIG. 14.

As shown in FIG. 19, the rectangular springs 304 are connected to the fixed base 322 through the amplifying arms 328, respectively. The amplifying arms 328 have arc notches 336 near the connecting portions with respect to the fixed base 322 and can rotate about the arc notches.

The apparatus further comprises a pair of piezoelectric actuators 340. The piezoelectric actuators 340 have ends fixed to the fixed base 322 and the other ends brought into contact with pins 338 installed near the arc notches 336 of the amplifying arms 328, respectively.

Further, the amplifying arms 328 have arms 330 perpendicularly extending from opposite sides of the pins 338 near the arc notches 336, respectively. The arms 330 have arc notches 334 near centers thereof, and feeding screws 332 for pressing front portions of the arc notches 334 are provided in the fixed base 322.

The elements mentioned above are all arranged in symmetrical with respect to the driving axis (the X axis).

The arc notch springs (the arc notches 314 and 334) are integrally formed with the movable table 302, the rectangular springs 304 and 306, the amplifying arms 308 and 328, and the fixed base 322 together with the arms 310 and 330.

The movable table 302 is driven in the Y direction by applying a voltage to the piezoelectric actuators 320 and in the X direction by applying a voltage to the piezoelectric actuators 340. The piezoelectric actuators 320 contract/expand in accordance with an application of the voltage so as to press the amplifying arms 308 in the Y direction. Accordingly, the amplifying arms 308 rotate about the arc notches 316.

Further, the piezoelectric actuators 340 contract/expand in accordance with an application of the voltage so as to press the amplifying arms 328 in the X direction. Accordingly, the amplifying arms 328 rotate about the arc notches 336.

Since the pins 318 and 338 brought into contact with the piezoelectric actuators 320 and 340 are positioned near the arc notches 316 and 336, the displacements of the piezoelectric actuators 320 and 340 are amplified in accordance with a principle of a lever and transmitted to the movable table 302.

The rectangular springs 306 have a high rigidity in the Y direction, however, have a low rigidity with respect to the X direction perpendicular thereto. To the contrary, the rectangular springs 304 have a low rigidity in the Y direction, however, have a high rigidity in the X direction.

Accordingly, the rectangular springs 306 efficiently transmit the rotational displacement of the amplifying arms 308 to the movable table 302 and the rectangular springs 304 do not prevent the movable table 302 from moving in the Y direction in accordance therewith. In the same manner, with respect to the rotational displacement of the amplifying arms 328, the rectangular springs 304 efficiently transmit the rotational displacement of the amplifying arms 328 to the movable table 302 and the rectangular spring 306s do not prevent the movable table 302 from moving in the X direction in accordance therewith. Accordingly, the movable table 302 is efficiently moved in both of the X direction and the Y direction.

Further, it is possible to compensate a dispersion due to an individual difference between the pair of piezoelectric actuators 320 by adjusting a feeding amount of the feeding screws 312 so as to adjust a load applied to the piezoelectric actuators 320. Still further, it is possible to compensate a dispersion due to an individual difference between the pair of piezoelectric actuators 340 by adjusting a feeding amount of the feeding screws 332 so as to adjust a load applied to the piezoelectric actuators 340. Accordingly, the movable table 302 can be moved in both of the X direction and the Y direction at a high linearity.

That is, the arc notches 314 and 334 serve as a variable pre-pressurizing spring on the basis of the load pressing the arms 310 and 330 and constitutes a load adjusting mechanism for adjusting the load F applied to the piezoelectric actuators 320 and 340 together with the feeding screws 312 and 332. It is possible to suitably adjust the displacement of the piezoelectric actuators 320 and 340 by adjusting the load adjusting mechanism.

[Stage Apparatus Provided with Small-Sized Displacement Amplifying Mechanism]

Figure 20:
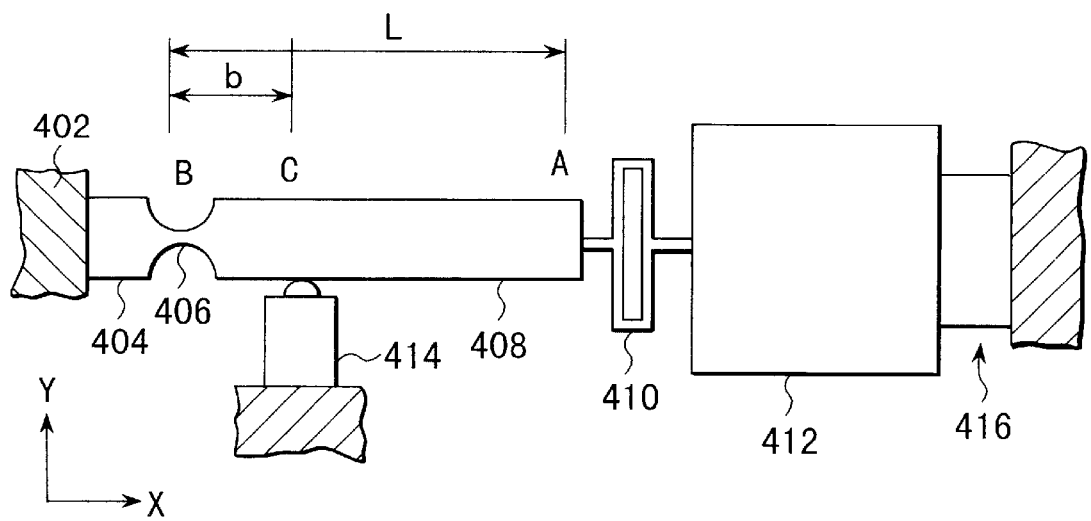
FIG. 20 is a schematic view showing one of displacement amplifying mechanisms applied to the stage apparatus shown in FIG. 1.

FIG. 20 schematically shows one of displacement amplifying mechanisms applied to the stage apparatus shown in FIG. 1. The displacement amplifying mechanism has a support member 404 mounted to a fixed base 402 and an amplifying arm 408 connected to the support member 404 through a hinge spring 406 and extending in the X direction. An end portion of the amplifying arm 408 is connected to a movable table 412 through a rectangular spring 410, and a side surface of the amplifying arm 408 is pressed in the Y direction by an actuator 414. In this model, the movable table 412 is movably supported in the Y direction by a pair of parallel springs 416, on the convenience of explanation.

When setting a distance from the hinge spring 406 serving as a fulcrum B for rotation of the amplifying arm 408 to an output end A of the amplifying arm 408 to L, and a distance from the fulcrum B to a pressing point C of the piezoelectric actuator 414 to b, a displacement amplifying rate of the output end A is increased in accordance that the distance L is increased with respect to the distance b, that is, in accordance that a leverage L/b is increased. As a result, it is possible to enlarge the displacement of the movable table 412 (a moving amount in the Y direction).

One manner for increasing the displacement amplifying rate is to increase a size of the amplifying arm 408 in the X direction. However, when using the long amplifying arm 408, the displacement amplifying mechanism is enlarged in the X direction at that degree.

Another manner for increasing the displacement amplifying rate is to use the large-sized piezoelectric actuator 414 which has a relatively long stroke, that is, the piezoelectric actuator 414 having a long size in the Y direction. However, when using the long piezoelectric actuator 414, the displacement amplifying mechanism is enlarged in the Y direction at that degree.

Figure 21:
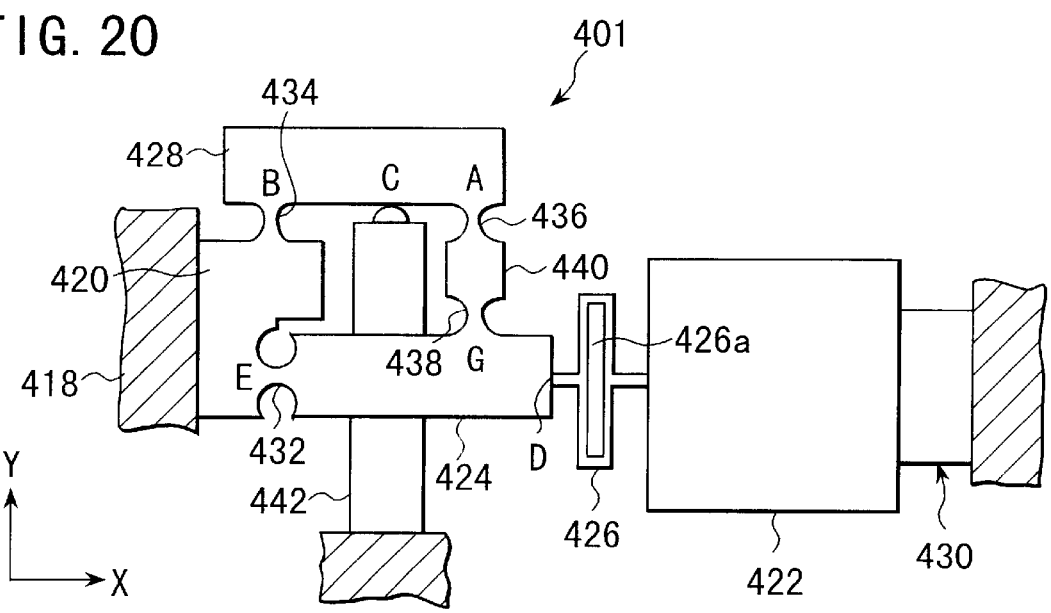
FIG. 21 is a schematic view showing a small-sized displacement amplifying mechanism.

FIG. 21 schematically shows a small-sized displacement amplifying mechanism 401. The displacement amplifying mechanism 401 comprises a support member 420 integrally mounted to the fixed base 418, a first amplifying arm 428 having one end supported to the support member 420 and extending in the X direction, a second amplifying arm 424 having one end supported to the support member 420 and extending in parallel to the first amplifying arm 428, and connecting means for connecting the first amplifying arm 428 to the second amplifying arm 424.

The connecting means comprises hinge springs 436 and 438, and a rigid connecting member 440 connected to the first amplifying arm 428 and the second amplifying arm 424 through these springs.

The first amplifying arm 428 is structured such that a pressing force is applied from the direction perpendicular to the extending direction, that is, the Y direction by the piezoelectric actuator 442. The second amplifying arm 424 is connected to the movable table 422 through the rectangular spring 426. In this model, the movable table 412 is movably supported in the Y direction by a pair of parallel springs 430.

The support member 420 may be mounted to the fixed base 418 from a rear portion or may be previously mounted to the fixed base 418 as a unit.

The rectangular spring 426 has a relatively long size in the Y direction, and is formed in a rectangular shape having a hollow portion 426a extending along the Y direction. The rectangular spring 426 has a high rigidity in a moving direction of the movable table 422, that is, the Y direction, and has a low rigidity in the direction perpendicular to the moving direction, that is, the X direction.

The first amplifying arm 428 has one end connected to the support member 420 through the first hinge spring 434 and the other end connected to the side of the other end of the second amplifying arm 424 through connecting means mentioned below. Further, the second amplifying arm 424 has one end connected to the support member 420 through the second hinge spring 432 and the other end connected to the movable table 422 through the rectangular spring 426 mentioned above. The first amplifying arm 428 is rotatable about the first hinge spring 434, and the second amplifying arm 424 rotatable about the second hinge spring 432. The side of the other end of the second amplifying arm 424 means a position a predetermined amount shifted from the other end of the second amplifying arm 424 to the side of one end.

Figure 22:
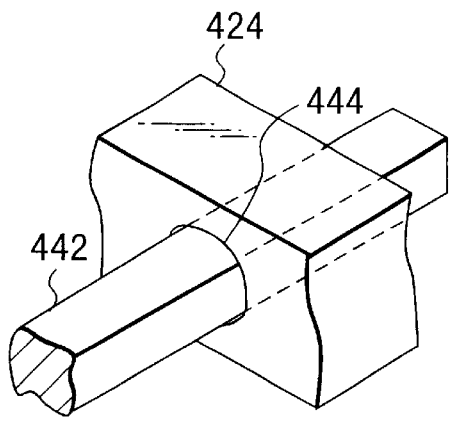
FIG. 22 is a schematic view showing a piezoelectric actuator which extends through a through hole formed in a second amplifying arm.
Figure 23:
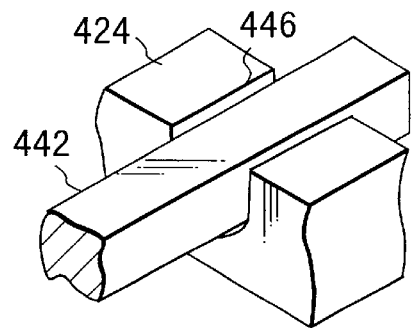
FIG. 23 is a schematic view showing a piezoelectric actuator which extends through a through groove formed in the second amplifying arm.

The piezoelectric actuator 442 extends toward the first amplifying arm 428 with crossing the second amplifying arm 424, and applies the pressing force only to the first amplifying arm 428 as occasion demands. The second amplifying arm 424 has a cavity, and the piezoelectric actuator 442 passes through the cavity. The cavitycomprises, for example, a through hole 444 formed in the second amplifying arm 424 as shown in FIG. 22, and may be a through groove 446 formed in the second amplifying arm 424 as shown in FIG. 23 in accordance with another example.

In the case of moving the movable table 422 in the Y direction, when extending the piezoelectric actuator 422 so as to apply a pressing force to a part (a C point) of the first amplifying arm 428, the first amplifying arm 428 rotates about the first hinge spring 434 as a fulcrum. A part (an A point) of the hinge portion 436 connecting the other end of the first amplifying arm 428 to the connecting member 440 displaces over a displacement or extension of the piezoelectric actuator 442. Since the connecting member 440 is pulled by the hinge spring 436 and displaces, a part (a G point) of the hinge spring 438 connecting the connecting member 440 to the side of the other end of the second amplifying arm 424 is pulled by the connecting member 440 and displaces. The second amplifying arm 424 rotates about the second hinge spring 432 as a fulcrum (an E point) in accordance with the displacement of a G point. As a result, it is possible to move the movable table 422 connected to the other end of the second amplifying arm 424 through the rectangular spring 426 in the Y direction. A displacement of a connecting point D between the second amplifying arm 424 and the rectangular spring 426 corresponds to an output displacement of the displacement amplifying mechanism.

In the displacement amplifying mechanism shown in FIG. 20, a nonuse space is expanded in a side of the upper portion of the amplifying arm 408.

In the displacement amplifying mechanism 401 shown in FIG. 21, the relatively long piezoelectric actuator 442 is arranged all around the nonuse space in the displacement amplifying mechanism in FIG. 20 without changing a size of a whole of the displacement amplifying mechanism. As a result, since it is possible to increase the output displacement of the piezoelectric actuator 442, it is possible to obtain a displacement amplifying rate sufficient for compensate a leverage even in the case that the leverage is small at the connecting point D between the second amplifying arm 424 and the rectangular spring 426.

In other words, in the displacement amplifying mechanism 401 shown in FIG. 21, the piezoelectric actuator 442 is structures such that one end (the C point) thereof is brought into contact with the first amplifying arm 428 and the other end is fixed to the fixed base 418 in an opposite side of the first amplifying arm 428 with reference to the second amplifying arm 424. Accordingly, it is possible to use the piezoelectric actuator 442 longer than the displacement amplifying mechanism in FIG. 20 without changing a size of a whole, as a result, it is possible to move the movable table 422 at the displacement amplifying rate greater than that of the displacement amplifying mechanism in FIG. 20.

Further, in this displacement amplifying mechanism, since it is possible to shorten the first amplifying arm 428 and the second amplifying arm 424, it is possible to realize a small-size of the displacement amplifying mechanism. As a result, since a leverage is made small, it is possible to increase a displacement amplifying efficiency.

Figure 24:
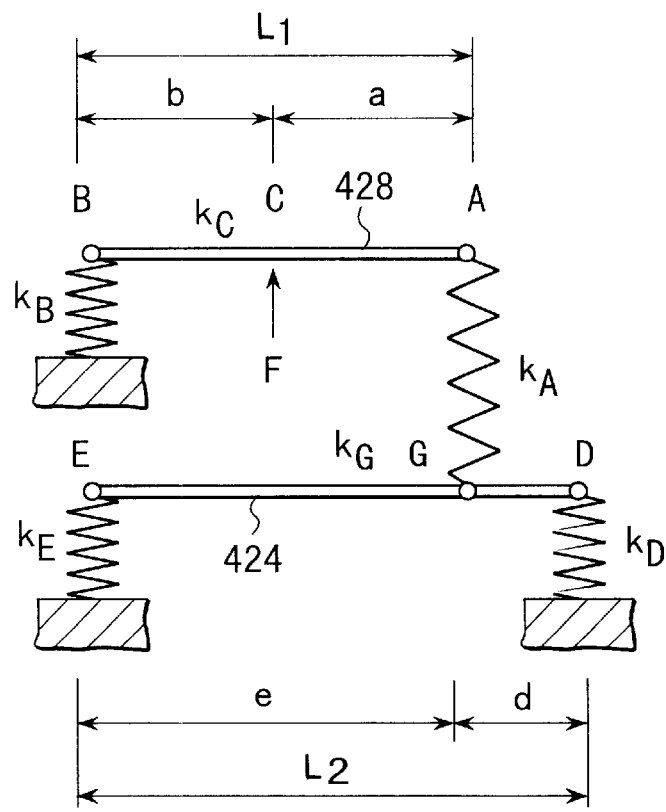
FIG. 24 is a schematic view showing an analyzing model for explaining a relationship between an output displacement of the displacement amplifying mechanism and lengths of the first and second amplifying arms which determine a size of the displacement amplifying mechanism.
Figure 25:
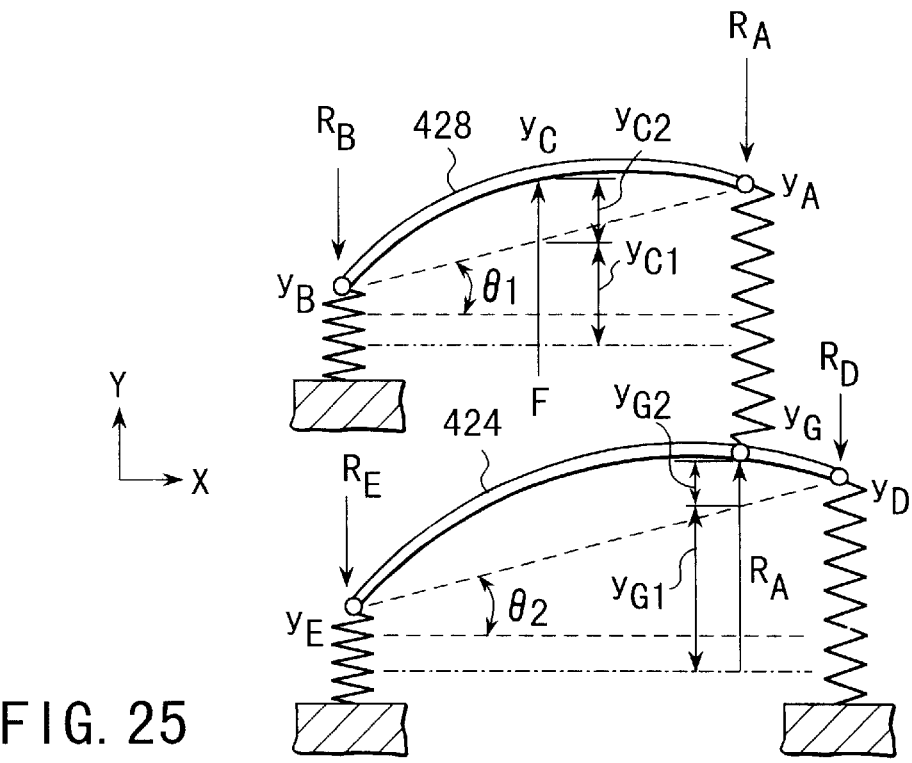
FIG. 25 is a schematic view showing an analyzing model in which a pressing force of the actuator is applied to a pressing point of the first amplifying arm.

Next, a description will be given of a relationship between the output displacement of the displacement amplifying mechanism 401 and the length of the first amplifying arm 428 and the second amplifying arm 424 which determine the size of the displacement amplifying mechanism 401, with reference to FIGS. 24 and 25. In FIGS. 24 and 25, an analysis model corresponding to the structure of the displacement amplifying mechanism 401 in FIG. 21 is illustrated. In order to simplify analysis, a moment of rotation generated in each of the hinge springs 432, 434, 436 and 438 will be ignored. Further, reference symbols A, B, C, D, E and G shown in FIG. 24 respectively correspond to positions of respective members illustrated in FIG. 21.

In this case, when setting a length between A and B of the first amplifying arm 428 to $L_1$, and a length between D and E of the second amplifying arm 424 to $L_2$, a position of the pressing point C of the piezoelectric actuator 442 with respect to the first amplifying arm 428 is defined to a distance a from the point A and a distance b from the point B. In this case, when applying the pressing force F to the pressing point C, the first amplifying arm 428 and the second amplifying arm 424 respectively displace as shown in FIG. 25.

The loads applied to each of the positions of the members at this time are expressed by the following equations.

$$R_A = (b/L_1) \cdot F \quad (2)$$

$$R_B = (b/L_1) \cdot F \quad (3)$$

$$R_D = (b/L_1) \cdot (e/L_2) \cdot F \quad (4)$$

$$R_E = (b/L_1) \cdot (d/L_2) \cdot F \quad (5)$$

Next, when setting the rigidity in the Y direction at each of the member positions to $k_A$, $k_B$, $k_C$, $k_D$, $k_E$ and $k_G$ (refer to FIG. 24), the displacements at the respective member positions are expressed by the following equations as shown in FIG. 25.

$$Y_A = (R_A/k_A) + Y_G \quad (6)$$

$$Y_B = (R_B/k_B) \quad (7)$$

$$Y_C = Y_{C1} + Y_{C2} \quad (8)$$

$$Y_D = R_D/k_D \quad (9)$$

$$Y_E = R_E/k_E \quad (10)$$

$$Y_G = Y_{G1} + Y_{G2} \quad (11)$$

Here, $Y_B$ is a displacement of the hinge spring 436, YC is a displacement of the first hinge spring 434, $Y_D$ is an output displacement of the second amplifying arm 424, $Y_E$ is a displacement of the second hinge spring 432 and $Y_G$ is a displacement of the connecting portion between the second amplifying arm 424 and the hinge spring 438.

$$Y_{C1} = Y_B + [(Y_A - Y_B)/L_1] \cdot b \quad (12)$$

$$Y_{C2} = F/k_C \quad (13)$$

$$Y_{G1} = Y_E + [(Y_D - Y_E)/L2] \cdot e \quad (14)$$

$$Y_{G2} = R_A/k_G \quad (15)$$

Further, since the above equations are established, the following equation can be obtained by arranging these equations with respect to $Y_C$.

$$y_C = \left[\left(\frac{b}{L_1}\right)^2\left(\frac{1}{k_A}+\frac{1}{k_G}\right)+\left(\frac{a}{L_1}\right)^2\frac{1}{k_B}+\frac{1}{k_C}+\left(\frac{b\cdot e}{L_1\cdot L_2}\right)^2\frac{1}{k_D}+\left(\frac{b\cdot d}{L_1\cdot L_2}\right)^2\frac{1}{k_E}\right]\cdot F \quad (16)$$

The pressing point C of the piezoelectric actuator 442 with respect to the first amplifying arm 428 coincides with the displacement of the piezoelectric actuator 442. In this case, when setting the displacement of the piezoelectric actuator 442 in a state that the pressing force is not applied to the first amplifying arm 428 to $Y_{PZT}$, the displacement of the piezoelectric actuator 442 at a time of applying the pressing force F to the pressing point C can be expressed by the following equation.

$$y_C = y_{PZT} - \frac{F}{k_{PZT}} \quad (17)$$

The pressing force F can be calculated on the basis of the equations (16) and (17) mentioned above.

$$F = y_{PZT}\cdot\left[\frac{1}{k_{PZT}}+\left(\frac{b}{L_1}\right)^2\left(\frac{1}{k_A}+\frac{1}{k_G}\right)+\left(\frac{a}{L_1}\right)^2\frac{1}{k_B}+\frac{1}{k_C}+\left(\frac{b\cdot e}{L_1\cdot L_2}\right)^2\frac{1}{k_D}+\left(\frac{b\cdot d}{L_1\cdot L_2}\right)^2\frac{1}{k_E}\right]^{-1} \quad (18)$$

An output displacement $Y_D$ of the displacement amplifying mechanism 401 (an output displacement of the second amplifying arm 424) at this time can be calculated on the basis of the following equation.

$$y_D = \frac{b\cdot e}{L_1\cdot L_2}\cdot\frac{y_{PZT}}{k_D}\cdot\left[\frac{1}{k_{PZT}}+\left(\frac{b}{L_1}\right)^2\left(\frac{1}{k_A}+\frac{1}{k_G}\right)+\left(\frac{a}{L_1}\right)^2\frac{1}{k_B}+\frac{1}{k_C}+\left(\frac{b\cdot e}{L_1\cdot L_2}\right)^2\frac{1}{k_D}+\left(\frac{b\cdot d}{L_1\cdot L_2}\right)^2\frac{1}{k_E}\right]^{-1} \quad (19)$$

Figure 26:
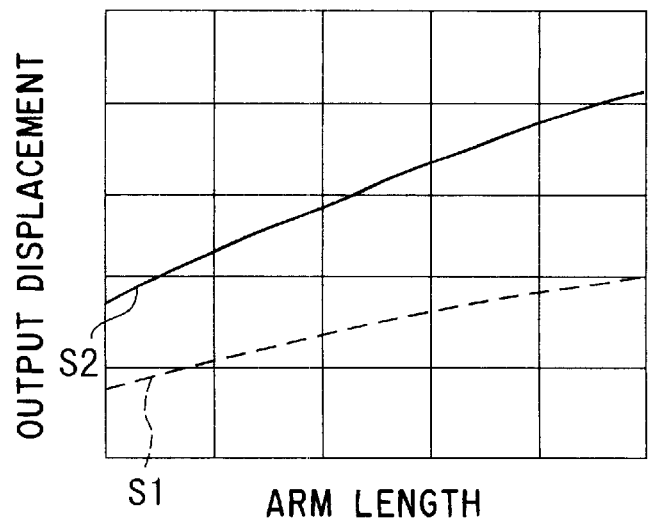
FIG. 26 is a schematic view showing a characteristic of the output displacement with respect to the length of the amplifying arm in the displacement amplifying mechanism shown in FIG. 20 and a characteristic of the output displacement with respect to the lengths of the first and second amplifying arms in the displacement amplifying mechanism shown in FIG. 21.

FIG. 26 shows a relationship between a characteristic S1 of the output displacement with respect to the length of the amplifying arm 408 in the displacement amplifying mechanism shown in FIG. 20 and a characteristic S2 of the output displacement with respect to the length of the first and second amplifying arms 428 and 424 in the displacement amplifying mechanism 401 shown in FIG. 21.

As is apparent by comparing the characteristics S1 and S2 with each other, in accordance with the displacement amplifying mechanism 401 shown in FIG. 21, it is possible to obtain the same output displacement as that of the displacement amplifying mechanism in FIG. 20.

Figure 27:
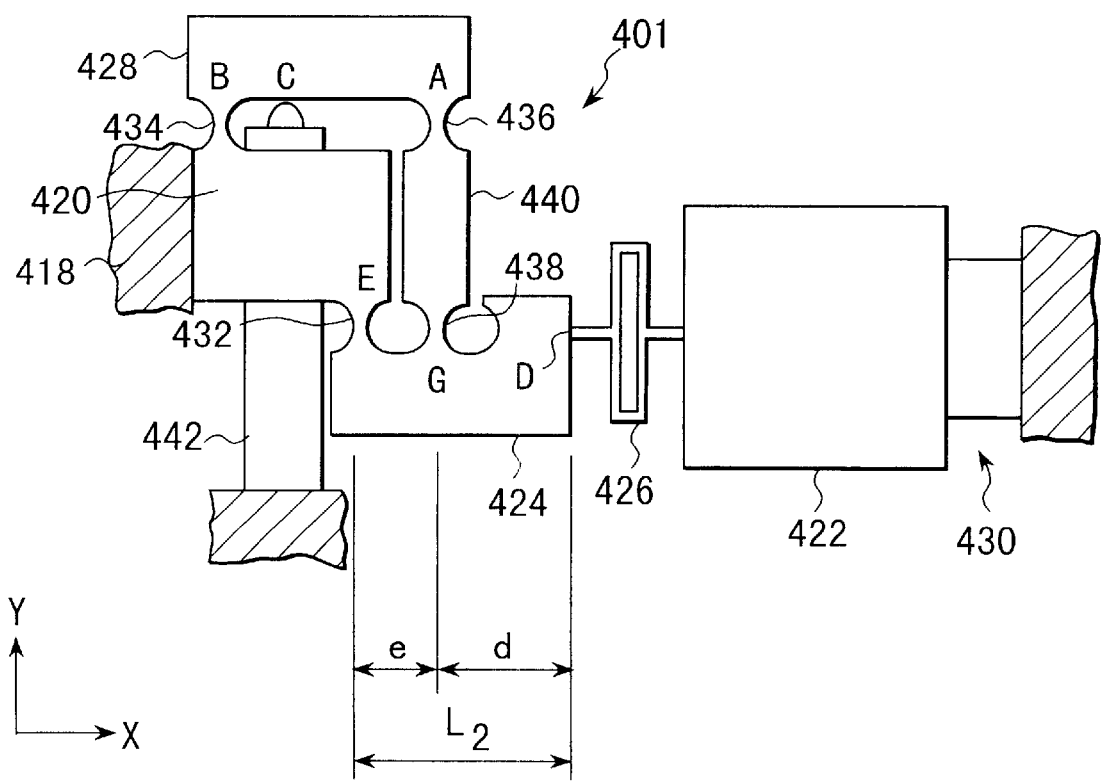
FIG. 27 is a schematic view showing another small-sized displacement amplifying mechanism.

Another small-sized displacement amplifying mechanism is shown in FIG. 27. In FIG. 27, the same reference numerals are attached to the same elements as those shown in FIG. 21.

In accordance with the displacement amplifying mechanism, a ratio $\epsilon=L_2/e$ between a distance e from the second hinge spring 432 to the hinge spring 438 and a distance $L_2$ from the second hinge spring 432 to the output displacement end of the second amplifying arm 424 (the connecting point D between the second amplifying arm 424 and the rectangular spring 426) is set to a value greater than that of the displacement amplifying mechanism shown in FIG. 21. In connection therewith, the piezoelectric actuator 442 extends toward the first amplifying arm 428 through the cavity formed in the support member 420, for example, the through hole (refer to FIG. 22) and the through groove (refer to FIG. 23).

In the displacement amplifying mechanism 401 in accordance with the modified embodiment, since $\epsilon$ is great, it is possible to obtain an output displacement further greater than that of the displacement amplifying mechanism shown in FIG. 21.

Figure 28:
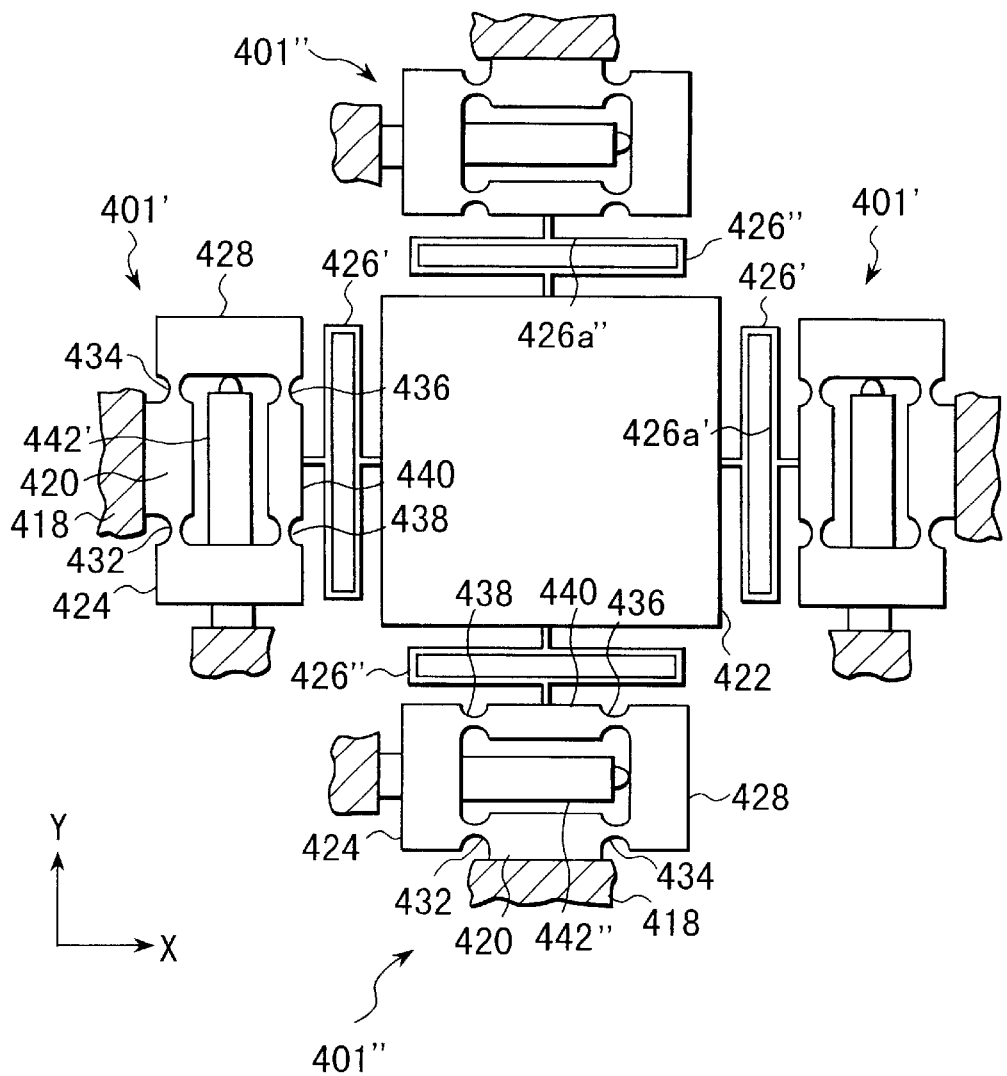
FIG. 28 is a schematic view showing a stage apparatus provided with a small-sized displacement amplifying mechanism.

A stage apparatus having the small-sized displacement amplifying mechanism shown in FIG. 21 is illustrated in FIG. 28. In FIG. 28, the same reference numerals are attached to the same elements as those shown in FIG. 21.

The stage apparatus comprises a fixed base 418, a movable table 422 moved with respect thereto, a pair of rectangular springs 426' provided in both sides of the movable table 422 along the X axis, a pair of rectangular springs 426" symmetrically provided in both sides of the movable table along the Y axis, a pair of piezoelectric actuators 442' generating a displacement for moving the movable table 422 in the Y direction, a pair of displacement amplifying mechanisms 401' amplifying a displacement of a pair of actuators 442' and transmitting it to a pair of rectangular springs 426', a pair of piezoelectric actuators 442" generating a displacement for moving the movable table 422 in the X direction, and a pair of displacement amplifying mechanisms 401" amplifying a displacement of a pair of actuators 442" and transmitting it to a pair of rectangular springs 426".

The displacement amplifying mechanisms 401' and 401" are basically the same as the displacement amplifying mechanism 401 mentioned above, and the movable table 422 is elastically supported by the rectangular spring 426' in each of a pair of displacement amplifying mechanisms 401' arranged in a symmetrical manner and the rectangular spring 426" in each of a pair of displacement amplifying mechanisms 401" arranged in a symmetrical manner in such manner as to freely move in the XY direction.

The rectangular spring 426' has a relatively long size in the Y direction, and has a rectangular shape having a hollow portion 426a' extending along the Y direction. The rectangular spring 426" has a high rigidity with respect to the Y direction, and has a low rigidity with respect to the X direction.

The rectangular spring 426" has a relatively long size in the X direction, and has a rectangular shape having a hollow portion 426a" extending along the X direction. The rectangular spring 426" has a high rigidity with respect to the X direction and a low rigidity with respect to the Y direction.

Since the rectangular springs 426' and 426" elastically supporting the movable table 422 are connected to the connecting member 440, the displacement outputting position of each of the displacement amplifying mechanisms 401' and 401" corresponds to the connecting member 440. Accordingly, the connecting members 440 form a symmetrical shape with respect to a center line of the movable table 422.

In the case of moving the movable table 422 in the X direction, when extending the piezoelectric actuators 442" of a pair of displacement amplifying mechanisms 401" so as to apply the pressing force to the first amplifying arm 428, a pair of connecting members 440 simultaneously displace in the X direction over the displacement or extension of the piezoelectric actuator 442". At this time, since the rectangular springs 426" connected to a pair of connecting members 440 respectively have a high rigidity in the moving direction (the X direction) of the movable table 422, they move in the Y direction at an amount corresponding to the displacement of a pair of connecting members 440 with hardly performing an elastic deformation. As a result, it is possible to move the movable table 422 in the X direction at a great displacement amplifying rate.

On the other hand, in the case of moving the movable table 422 in the Y direction, when extending the piezoelectric actuators 422' of a pair of displacement amplifying mechanisms 401' so as to apply the pressing force to the first amplifying arm 428, a pair of connecting members 440 simultaneously displace in the Y direction over the displacement or extension of the piezoelectric actuator 442'. At this time, since the rectangular springs 426' connected to a pair of connecting members 440 respectively have a high rigidity in the moving direction (the Y direction) of the movable table 422, they move in the Y direction at an amount corresponding to the displacement of a pair of connecting members 440 with hardly performing an elastic deformation. As a result, it is possible to move the movable table 422 in the Y direction at a great displacement amplifying rate.

Since the stage apparatus can use the longer piezoelectric actuator 442 in comparison with the apparatus shown in FIG. 1, it is possible to move the movable table 422 in the XY direction at a great displacement amplifying rate.

[Consideration with Respect to Shape of Hinge]

A description will be given of a consideration with respect to a shape of a hinge in the small-sized displacement amplifying mechanism shown in FIG. 29.

Figure 29:
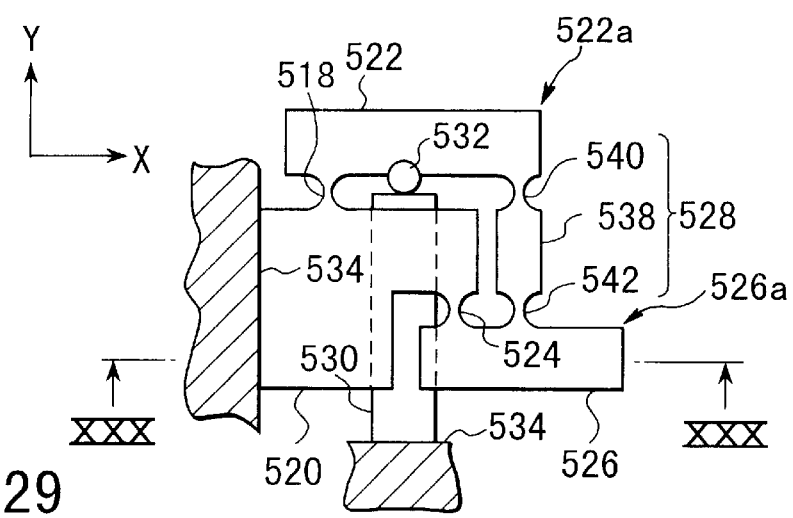
FIG. 29 is a schematic view showing a small-sized displacement amplifying mechanism for considering a shape of a hinge.

The displacement amplifying mechanism is, as shown in FIG. 29, provided with a support member 520 fixed to a fixed base 534, a first amplifying arm 522, a first elastic connecting portion 518 connecting the first amplifying arm 522 to the support member 520 in such a manner as to freely rotate, a second amplifying arm 526 extending in parallel to the first amplifying arm 522, a second elastic connecting portion 524 connecting the second amplifying arm 526 to the support member 520 in such a manner as to freely rotate, and a connecting member 528 connecting the first amplifying arm 522 to the second amplifying arm 526.

An actuator 530 which generates a displacement to be amplified by the displacement amplifying mechanism is structured such that one end is fixed to the fixed base 534 and extends toward the first amplifying arm 522 along the Y direction through a through hole (refer to FIG. 30) formed in the support member 520. A free end of the actuator 530 is brought into contact with a pressing portion 532 provided in the first amplifying arm 522.

The pressing portion 532 is preferably made of a material having a rigidity higher than that of the first amplifying arm 522. Further, the pressing portion 532 preferably has a shape which can disperse the pressing force of the actuator 530 without concentrating and transmit to the first amplifying arm 522, for example, a round shape or a substantially triangular shape.

The connecting member 528 is constituted by a connecting arm 538 extending in the Y direction, and first and second connecting elastic portions 540 and 542 provided in both ends of the connecting arm 538 in the Y direction, and the connecting arm 538 is connected to the first and second amplifying arms 522 and 526 through the first and second connecting elastic portions 540 and 542. Concretely, the connecting arm 538 is connected to a side of a front end of the first amplifying arm 522 through the first connecting elastic portion 540, and is connected near to the second elastic connecting portion 524 of the second amplifying arm 526 through the second connecting elastic portion 542.

Figure 31:
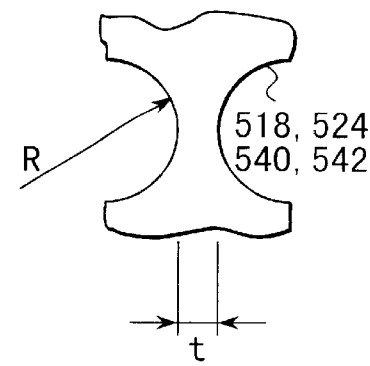
FIG. 31 is a schematic view showing an arc-shaped hinge.

The first and second elastic connecting portions 518 and 524 and the first and second connecting elastic portions 540 and 542 comprise arc-shaped hinges, for example, shown in FIG. 31. The arc-shaped hinge is obtained by suitably selecting a radius R of an arc and a minimum width t between radii of the arcs as shape parameters for setting the rigidity, as mentioned above, and the arc-shaped hinge has an effective shape for constructing the displacement amplifying mechanism since the shape parameters can be set in detail.

In this case, it is considered that a thickness is uniform all over the displacement amplifying mechanism, but it is not considered that a thickness direction is a shape parameter for the arc-shaped hinge, however, the thickness direction may be set as the shape parameter.

Further, in the drawings, the structure is made such that the first and second elastic connecting portions 518 and 524 are integrally connected to the first and second amplifying arms 522 and 526 and the support member 520, however, the first and second elastic connecting portions 518 and 524 may be formed by a material independent from the first and second amplifying arms 522 and 526 and the support member 520. In the same manner, the structure is made such that the first and second connecting elastic portions 540 and 542 are integrally connected to the connecting arm 538 and the first and second amplifying arms 522 and 526, however, the first and second connecting elastic portions 540 and 542 may be formed by a material independent from the connecting arm 538 and the first and second amplifying arms 522 and 526.

In accordance with the structure mentioned above, as shown in FIG. 33, in response to the contraction/expansion of the actuator 530, the pressing force of the actuator 530 is transmitted to the first amplifying arm 522 through the pressing portion 532, and a front end 522a of the first amplifying arm 522 rotates about the first elastic connecting portion 518 at a predetermined angle of incline $\theta_1$. At this time, the rotational motion of the first amplifying arm 522 is transmitted to the second amplifying arm 526 through the connecting member 528 mentioned above, as a result, it is possible to rotate a front end (a displacement outputting end) 526a of the second amplifying arm 526 about the second elastic connecting portion 524 at a predetermined angle of incline $\theta_2$ ($>\theta_1$).

Figure 33:
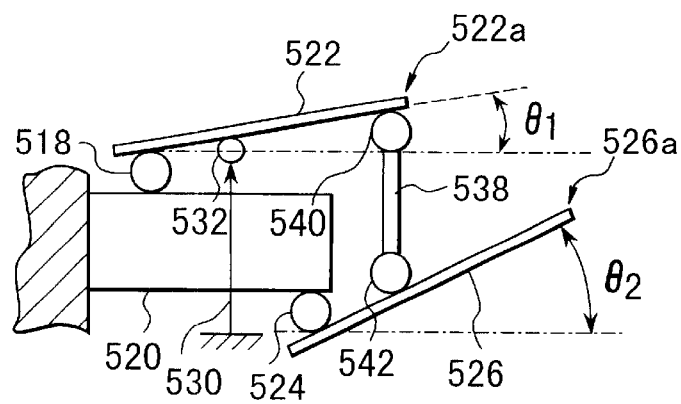
FIG. 33 is a schematic view showing an analyzing model in which a pressing force of the actuator is applied.

As is known from FIG. 33, since the angle of incline $\theta_1$ of the first amplifying arm 522 and the angle of incline $\theta_2$ of the second amplifying arm 526 are different ($\theta_2>\theta_1$), stresses generated in the arc-shaped hinges applied to the first and second elastic connecting portions 518 and 524 and the first and second connecting elastic portions 540 and 542 are variously different. In this case, the first and second elastic connecting portions 518 and 524 and the first and second connecting elastic portions 540 and 542 (that is, the arc-shaped hinges 518, 524, 540 and 542) should be set to a shape which is not over the maximum allowable stress of the material for the arc-shaped hinges 518, 524, 540 and 542. Concretely, the radii R of the arcs in the both sides of each of the arc-shaped hinges 518, 524, 540 and 542 and the minimum width t between the radii R of the arcs are set so that a predetermined displacement amount (that is, an angle of incline $\theta_2$) can be obtained at the front end (the displacement outputting end) 526a of the second arm 526 (refer to FIG. 31).

Figure 32:
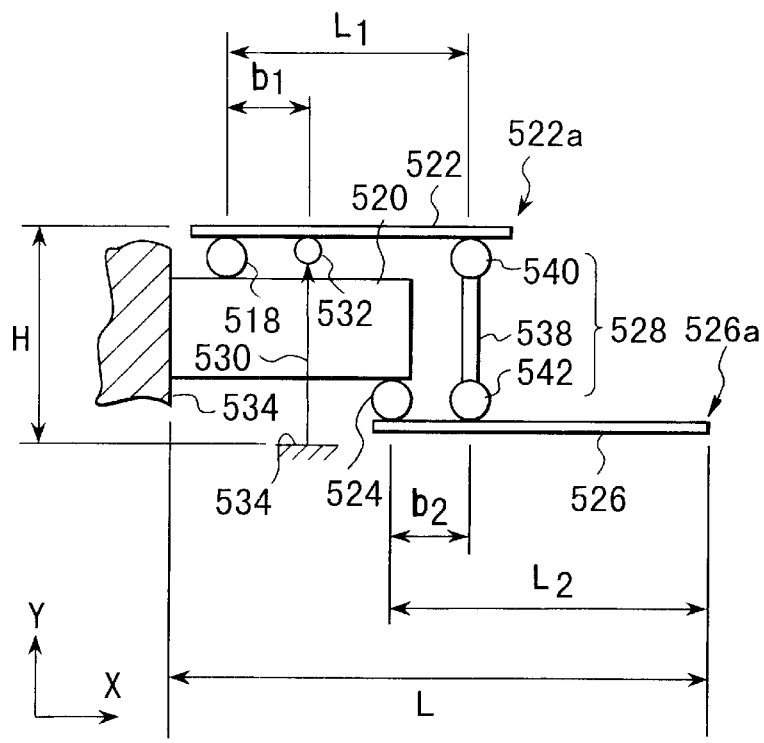
FIG. 32 is a schematic view showing an analyzing model which shows a leverage in the displacement amplifying mechanism shown in FIG. 29.

Further, on the basis of the set conditions, a leverage of the first and second amplifying arms 522 and 526 is set. Concretely, as shown in FIG. 32, a length $L_1$ of the first amplifying arm 522 (concretely, a length of the first amplifying arm 522 from the first elastic connecting portion 518 to the first connecting elastic portion 540), a length $b_1$ from the first elastic connecting portion 518 to the pressing portion 532, a length $L_2$ of the second amplifying arm 526 (concretely, a length from the second elastic connecting portion 524 to the front end (the displacement outputting end) 526a of the second amplifying arm 526), and a length $b_2$ from the second elastic connecting portion 524 to the second connecting elastic portion 542 are respectively set.

On the basis of a leverage of the first and second amplifying arms 522 and 526, a length L (refer to FIG. 32) of a whole of the displacement amplifying mechanism in the X direction is also changed, however, it is possible to make the length L of the whole of the displacement amplifying mechanism in the X direction to minimum by setting the shape of each of the arc-shaped hinges 518, 524, 540 and 542 within a range which is not over the maximum allowable stress of the material for the first and second elastic connecting portions 518 and 524 and the first and second connecting elastic portions 540 and 542 (that is, the arc-shaped hinges 518, 524, 540 and 542).

Hereinafter, a description will be given in detail of a relationship between the shape of each of the arc-shaped hinges 518, 524, 540 and 542, and the length L of the whole of the displacement amplifying mechanism in the X direction.

Here, when setting a displacement of the actuator 530 in the Y direction to $Y_{PZT}$, a displacement of the front end 522a of the first amplifying arm 522 in the Y direction (concretely, the displacement of the connecting portion between the first amplifying arm 522 and the first connecting elastic portion 540) to $Y_1$, and a displacement of the front end (the displacement outputting end) 526a of the second amplifying arm 526 in the T direction to y, the following equations are established.

$$y_1 = y_{PZT} \cdot \frac{L_1}{b_1} \quad (20)$$

$$y = y_{PZT} \cdot \frac{L_1 L_2}{b_1 b_2} \quad (21)$$

Further, the angles of incline $\theta_1$ and $\theta_2$ of the first and second amplifying arms 522 and 526 at this time can be expressed by the following equations.

$$\theta_1 = \frac{y_{PZT}}{b_1} \quad (22)$$

$$\theta_2 = y_{PZT} \cdot \frac{L_1}{b_1 b_2} \quad (23)$$

In general, a moment of rotation M of the arc-shaped hinges 518, 524, 540 and 542 is expressed by the following equation.

$$M = \frac{2Ew}{9\pi} \cdot \frac{t^{5/2}}{R^{1/2}} \cdot \theta \quad (24)$$

Figure 30:
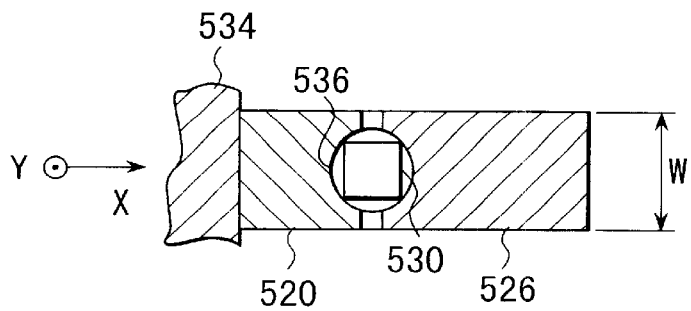
FIG. 30 is a cross section taken along the line XXX—XXX in FIG. 29.

Where, E is a vertical elastic modulus, and w is a width of the displacement amplifying mechanism (refer to FIG. 30).

Here, when setting radii of the arcs in both sides of the arc-shaped hinge 518 corresponding to the first elastic connecting portion to $R_{518}$, a minimum width between the radii of the arcs to $t_{518}$, radii of the arcs in both sides of the arc-shaped hinge 524 corresponding to the second elastic connecting portion to $R_{524}$, and a minimum width between the radii of the arcs to $t_{524}$, moments of rotation $M_{518}$ and $M_{524}$ of the respective arc-shaped hinges 518 and 524 can be expressed by the following equations.

$$M_{518} = \frac{2Ew}{9\pi} \cdot \frac{t_{518}^{5/2}}{R_{518}^{1/2}} \cdot \theta_1 \quad (25)$$

$$M_{524} = \frac{2Ew}{9\pi} \cdot \frac{t_{524}^{5/2}}{R_{524}^{1/2}} \cdot \theta_2 \quad (26)$$

Where, since the arc-shaped hinges 540 and 542 corresponding to the first and second connecting elastic portions are suitably set in the shape by which the predetermined displacement (that is, the angle of incline $\theta_2$) can be obtained at the front end (the displacement outputting end) 526a of the second amplifying arm 526, as mentioned above, an explanation will not be added here.

Further, when setting a section modulus of a minimum thickness portion (a portion corresponding to the minimum width $t_{518}$) of the arc-shaped hinge 518 corresponding to the first elastic connecting portion to $Z_{518}$, and a section modulus of a minimum thickness portion (a portion corresponding to the minimum width $t_{524}$) of the arc-shaped hinge 524 corresponding to the second elastic connecting portion to $Z_{524}$, the section moduli $Z_{518}$ and $Z_{524}$ of the respective arc-shaped hinges 518 and 524 can be expressed by the following equations.

$$Z_{518} = \frac{w \cdot t_{518}^2}{6} \quad (27)$$

$$Z_{524} = \frac{w \cdot t_{524}^2}{6} \quad (28)$$

Further, when setting a stress concentration factor of the arc-shaped hinge 518 corresponding to the first elastic connecting portion to $\alpha_{518}$, and a stress concentration factor of the arc-shaped hinge 524 corresponding to the second elastic connecting portion to $\alpha_{524}$ stresses $\sigma_{518}$ and $\alpha_{524}$ of the respective arc-shaped hinges 518 and 524 can be expressed by the following equations.

$$\sigma_{518} = \alpha_{518} \cdot \frac{4E}{3\pi} \cdot \frac{t_{518}^{1/2}}{R_{518}^{1/2}} \cdot \frac{y_{PZT}}{b_1} \quad (29)$$

$$\sigma_{524} = \alpha_{524} \cdot \frac{4E}{3\pi} \cdot \frac{t_{524}^{1/2}}{R_{524}^{1/2}} \cdot \frac{L_1 y_{PZT}}{b_1 b_2} \quad (30)$$

In this case, the stresses $\sigma_{518}$ and $\sigma_{524}$ of the respective arc-shaped hinges 518 and 524 are required to be equal to or less than a maximum allowable stress $\sigma_a$ of the respective arc-shaped hinges 518 and 524 ($\sigma_{518} \leq \sigma_a$, $\sigma_{524} \leq \sigma_a$).

Here, considering the arc-shaped hinge 518 corresponding to the first elastic connecting portion, it is known that a shape of the arc-shaped hinge 518 satisfying the maximum allowable stress $\sigma_a$ is determined only by the displacement $Y_{PZT}$ of the actuator 530 when setting $b_1$ in the equation (29) to a constant.

Figure 34:
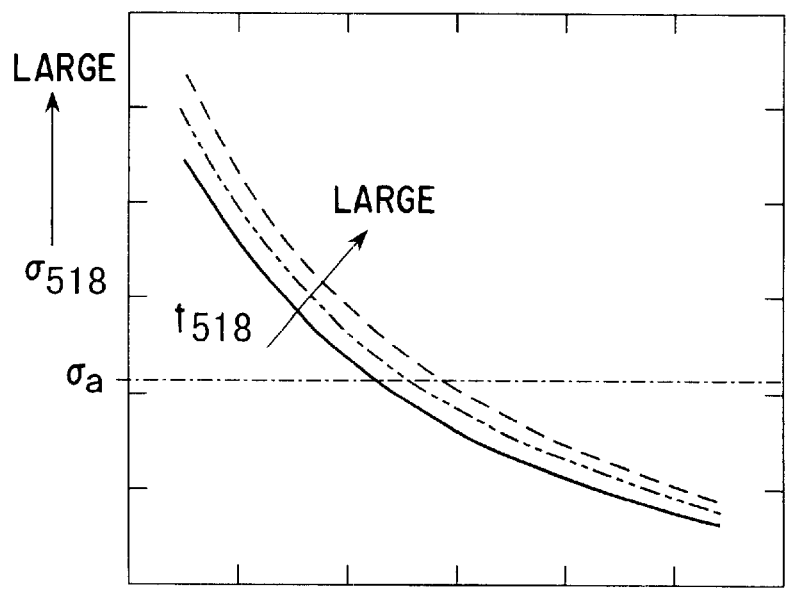
FIG. 34 is a schematic view showing a relationship between a stress and a shape parameter of an arc-shaped hinge corresponding to a first elastic connecting portion.

In FIG. 34, the equation (29) is graphed, with considering the case of displacing the first amplifying arm 522 at the angle of incline $\theta_1$, there is shown a relationship between the shape parameters $R_{518}$ and $t_{518}$ of the arc-shaped hinges 518 corresponding to the first elastic connecting portion and the stress $\sigma_{518}$. In this case, in the graph, a horizontal axis indicates the arc radius $R_{518}$ and a vertical axis indicates the stress $\sigma_{518}$. Further, a solid line, a dot line and a broken line respectively show the case of changing the minimum width $t_{518}$ between the arc radii (increasing the minimum width in a direction of an arrow), and the minimum width $t_{518}$ is increased in the order of the solid line, the dot line and the broken line.

As is known from the graphs of the solid line, the dot line and the broken line, when increasing the arc radius $R_{518}$, the stress $\sigma_{518}$ is reduced, and when increasing the minimum width $t_{518}$ between the arc radii, the stress $\sigma_{518}$ is also increased.

Further, a single dot chain line extending in parallel to a horizontal axis in the drawing defines a maximum allowable stress $\sigma_a$ of a material for the arc-shaped hinge 518 corresponding to the first elastic connecting portion, and the shape parameters $R_{518}$ and $t_{518}$ of the arc-shaped hinge 518 used as the first elastic connecting portion is necessarily set to the maximum allowable stress $\sigma_a$. In this case, it is possible to increase a rigidity of the arc-shaped hinge 518 used as the first elastic connecting portion within a range not over the maximum allowable stress $\sigma_a$ by suitably selectively combining the shape parameters $R_{518}$ and $t_{518}$ of the arc-shaped hinge 518 disposed on the single dot chain line showing the maximum allowable stress $\sigma_a$. As mentioned above, the shape of the arc-shaped hinge 518 is determined.

Next, in order to determine a length L of the whole of the displacement amplifying mechanism (refer to FIG. 32), a length $L_1$ of the first amplifying arm 522 (refer to FIG. 32) and a length $L_2$ of the second amplifying arm 526 (refer to FIG. 32) are determined by using the shape parameters $R_{524}$ and $t_{524}$ of the arc-shaped hinge 524 in a manner mentioned below.

The length $L_1$ of the first amplifying arm 522 (refer to FIG. 32) can be calculated in accordance with the equation (30) by replacing the stress $\sigma_{524}$ of the arc-shaped hinge 518 corresponding to the first elastic connecting portion by the maximum allowable stress $\sigma_a$. In particular, when modifying the equation (30) with respect to $L_1$ and replacing $\sigma_{524}$ by the maximum allowable stress $\sigma_a$, the length $L_1$ of the first amplifying arm 522 can be expressed by the following equation.

$$L_1 = \frac{b_1 b_2}{y_{PZT}} \cdot \frac{3\pi}{4E} \cdot \frac{R_{524}^{1/2}}{t_{524}^{1/2}} \cdot \frac{\sigma_a}{\alpha_{524}} \quad (31)$$

Further, the length $L_2$ of the second amplifying arm 526 (refer to FIG. 32) can be calculated by the equations (21) and (31). Concretely, it can be expressed by substituting the equation (31) for the equation (21) and modifying with respect to $L_2$, thereby being expressed by the following equation.

$$L_2 = y \cdot \frac{4E}{3\pi} \cdot \frac{t_{524}^{1/2}}{R_{524}^{1/2}} \cdot \frac{\alpha_{524}}{\sigma_a} \quad (32)$$

Since the length L of the whole of the displacement amplifying mechanism (refer to FIG. 32) can be expressed by the following equation $$L = L_1 + L_2 - b_2 \quad (33)$$

the following can be obtained by substituting the equations (31) and (32) for the equation (33).

$$L = \frac{b_1 b_2}{y_{PZT}} \cdot \frac{3\pi}{4E} \cdot \frac{R_{524}^{1/2}}{t_{524}^{1/2}} \cdot \frac{\sigma_a}{\alpha_{524}} + y \cdot \frac{4E}{3\pi} \cdot \frac{t_{524}^{1/2}}{R_{524}^{1/2}} \cdot \frac{\alpha_{524}}{\sigma_a} - b_2 \quad (34)$$

Figure 35:
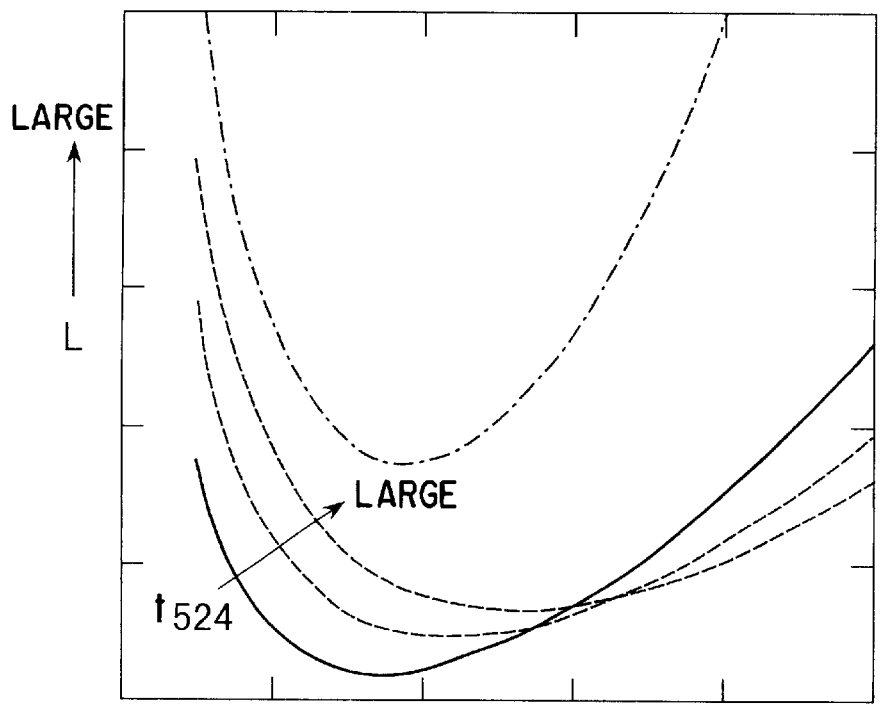
FIG. 35 is a schematic view showing a relationship between a length of a whole of the displacement amplifying mechanism and a shape parameter of an arc-shaped hinge corresponding to a second elastic connecting portion.

In FIG. 35, the equation (34) is graphed, and on the assumption of displacing the second amplifying arm 526 at an angle of incline $\theta_2$, there is a relationship between the shape parameters $R_{524}$ and $t_{524}$ of the arc-shaped hinge 524 corresponding to the second elastic connecting portion and the length L of the whole of the displacement amplifying mechanism. In this case, in the graph, a horizontal axis indicates the arc radius $R_{524}$ and a vertical axis indicates the length L of the whole of the displacement amplifying mechanism. Further, a solid line, a dot line and a broken line in FIG. 35 respectively show the case of changing the minimum width $t_{524}$ between the arc radii (increasing the minimum width in a direction of an arrow), and the minimum width $t_{524}$ is increased in the order of the solid line, the dot line and the broken line. In this case, it is assumed that relationships $R_{524} > R_{518}$ and $t_{524} < t_{518}$ are satisfied.

Further, the single dot chain line in FIG. 35 shows the length L of the whole of the displacement amplifying mechanism in the case that the arc-shaped hinge 518 corresponding to the first elastic connecting portion and the arc-shaped hinge 524 corresponding to the second elastic connecting portion have the same shape ($R_{524} = R_{518}$ and $t_{524} = t_{518}$).

As is known from the graph, the length L of the whole of the displacement amplifying mechanism has a limit value in accordance with the shape parameters $R_{524}$ and $t_{524}$ of the arc-shaped hinge 524. With respect to the limit value, a consideration will be given of a comparison between the displacement amplifying mechanism in which the first elastic connecting portion 518 and the second elastic connecting portion 524 have the same shape and the displacement amplifying mechanism in which the first elastic connecting portion 518 and the second elastic connection portion 524 have different shapes. As a result, it is known that it is possible to make the length L of the whole of the displacement amplifying mechanism shorter than that of the displacement amplifying mechanism in which the first elastic connecting portion 518 and the second elastic connecting portion 524 have the same shape, by suitably selectively combining the shape parameters $R_{518}$, $t_{518}$, $R_{524}$ and $t_{524}$ of the respective arc-shaped hinges 518 and 524 so that the shapes of the arc-shaped hinge 518 corresponding to the first elastic connecting portion and the arc-shaped hinge 524 corresponding to the second elastic connecting portion are relatively different.

In this case, there are the following three methods as methods of relatively differentiating the shape parameters of the respective arc-shaped hinges 518 and 524.

A first method is a method of mutually differentiating the minimum widths $t_{518}$ and $t_{524}$ by making the radii of the arcs $R_{518}$ and $R_{524}$ equal to each other.

A second method is a method of mutually differentiating the arc radii $R_{518}$ and $R_{524}$ by making the minimum widths $t_{518}$ and $t_{524}$ equal to each other.

A third method is a method of mutually differentiating the arc radii $R_{518}$ and $R_{524}$ and mutually differentiating the minimum widths $t_{518}$ and $t_{524}$. As mentioned above, it is possible to make the length L of the whole of the displacement amplifying mechanism significantly short by suitably selectively combining the shape parameters $R_{518}$, $t_{518}$, $R_{524}$ and $t_{524}$ of the respective arc-shaped hinges 518 and 524 so that the shapes of the arc-shaped hinge 518 corresponding to the first elastic connecting portion and the arc-shaped hinge 524 corresponding to the second elastic connecting portion are relatively different.

Further, since the actuator 530 extends from the fixed base 534 toward the first amplifying arm 522 through the opening 536 of the support member 520 and an extending end thereof is brought into contact with a pressing portion 532 of the first amplifying arm 522, it is possible to reduce a size H in a height direction of the whole of the displacement amplifying mechanism (refer to FIG. 32).

Still further, it is possible to increase the rigidity of each of the arc-shaped hinges 518 and 524 by setting the shape parameters $R_{518}$, $t_{518}$, $R_{524}$ and $t_{524}$ of the arc-shaped hinge 518 corresponding to the first elastic connecting portion and the arc-shaped hinge 524 corresponding to the second elastic connecting portion so that the stresses $\sigma_{518}$ and $\sigma_{524}$ of the respective arc-shaped hinges 518 and 524 corresponding to the first and second elastic connecting portions become the maximum allowable stress $\sigma_a$ of each of the arc-shaped hinges 518 and 524. As a result, it is possible to realize a displacement amplifying mechanism having a high resonance frequency. In this case, for example, when connecting the front end (the displacement outputting end) 526a of the second amplifying arm 526 to a microscope stage, it is possible to increase a positioning speed of the microscope stage.

In the above description, the first and second elastic connecting portions 518 and 524 and the first and second connecting elastic portions 540 and 542 are explained with respect to the structure provided with the arc-shaped hinges as an example, however, the other shapes may be employed.

As the shape of the notch hinge, there have been representatively known shapes illustrated in FIGS. 36 to 39.

Figure 36:
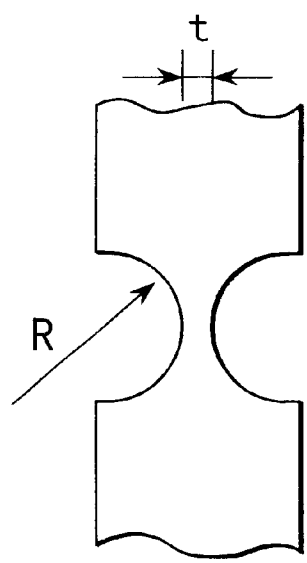
FIGS. 36 to 39 are schematic views showing various kinds of hinge shapes which may be applied to the elastic connecting portion.
Figure 38:
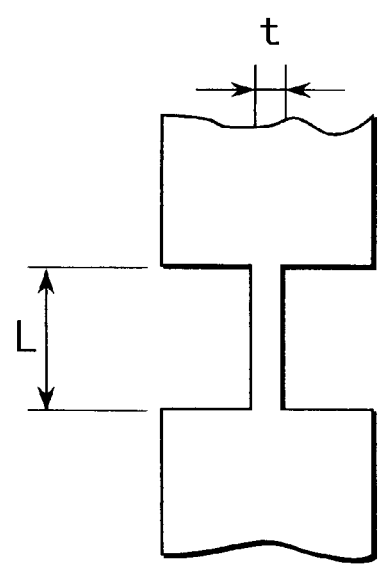
Figure 37:
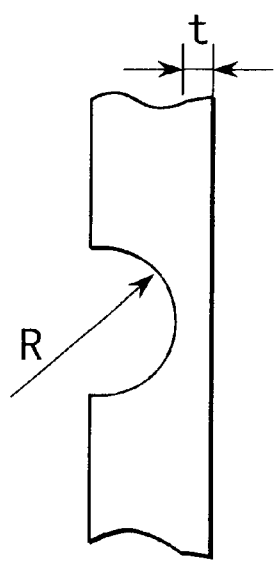
Figure 39:
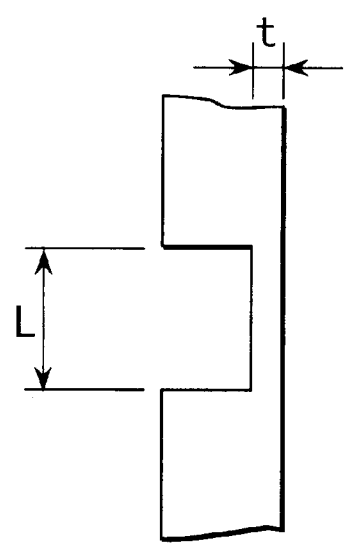

A linearly symmetrical arc-shaped hinge shown in FIG. 36 and a linearly non-symmetrical arc-shaped hinge shown in FIG. 37 have a small arc radius R, has a hinge rigidity which becomes greater as a hinge thickness t becomes greater, and a small output displacement.

This characteristic can be applied to hinges having the other shapes. For example, a linearly symmetrical plate spring hinge shown in FIG. 38 and a linearly non-symmetrical plate spring hinge shown in FIG. 39 has a small plate spring length L, has a hinge rigidity which becomes greater as a hinge thickness t becomes greater, and a small output displacement.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A stage apparatus including a displacement amplifying mechanism, which has a first axis and a second axis perpendicular thereto, the apparatus comprising:
    a fixed base;
    a movable table to be moved with respect to the fixed base;
    a pair of first elastic portions arranged between the fixed base and the movable table and provided in both sides of the movable table along the first axis in a symmetrical manner;
    a pair of second elastic portions arranged between the fixed base and the movable table and provided in both sides of the movable table along the second axis in a symmetrical manner;
    a pair of first actuators for generating a displacement for moving the movable table in a second direction; and
    a pair of first displacement amplifying mechanisms, arranged between the fixed base and the pair of first elastic portions, for amplifying the displacement of the pair of first actuators and transmitting it to the pair of first elastic portions,
    the first displacement amplifying mechanism comprising a first amplifying arm, a first elastic connecting portion for rotatably connecting the first amplifying arm to the fixed base, a second amplifying arm extending in parallel to the first amplifying arm and connected to the elastic portion, a second elastic connecting portion for rotatably connecting the second amplifying arm to the fixed base, and a connecting member for connecting the first amplifying arm to the second amplifying arm, and
    the first actuator extending toward the first amplifying arm across the second amplifying arm.

2. A stage apparatus according to claim 1, wherein the first elastic portion has a relatively low rigidity along the first axis and has a relatively high rigidity along the second axis, and the second elastic portion has a relatively high rigidity along the first axis and has a relatively low rigidity along the second axis.

3. A stage apparatus according to claim 2, wherein the first elastic portion comprises a long rectangular spring along the second axis having a hollow portion, and the second elastic portion comprises a long rectangular spring along the first axis having a hollow portion.

4. A stage apparatus according to claim 1, wherein the second amplifying arm has a cavity and the first actuator extends therethrough.

5. A stage apparatus according to claim 4, wherein the cavity comprises a through hole formed in the second amplifying arm.

6. A stage apparatus according to claim 4, wherein the cavity comprises a through groove formed in the second amplifying arm.

7. A stage apparatus according to claim 1, wherein the first elastic connecting portion and the second elastic connecting portion have different shapes.

8. A stage apparatus according to claim 7, wherein the first elastic connecting portion and the second elastic connecting portion have shapes which suppress the stress of the first and second elastic connecting portions less than the maximum allowable stress of materials of the first and second elastic connecting portions, respectively.

9. A stage apparatus according to claim 7, wherein the connecting member has a connecting amplifying arm, a first connecting elastic portion for connecting the connecting amplifying arm to the first amplifying arm and a second connecting elastic portion for connecting the connecting amplifying arm to the second amplifying arm, and each of the first elastic connecting portion, the second elastic connecting portion, the first connecting elastic portion and the second connecting elastic portion comprises an arc-shaped hinge.

10. A stage apparatus according to claim 1, wherein the first amplifying arm includes a receiving member brought into contact with the first actuator, and the receiving member disperses a force of the actuator and transmits to the first amplifying arm.

11. A stage apparatus according to claim 10, wherein the receiving member is made of a material harder than that of the first amplifying arm.

12. A stage apparatus according to claim 10, wherein the first actuator has a pressing member provided at a front end thereof and the pressing member is brought into contact with the receiving member.

13. A stage apparatus according to claim 12, wherein the pressing member is made of a material harder than that of the first amplifying arm.

14. A stage apparatus according to claim 12, wherein one of the pressing member and the receiving member brought into contact with each other has a curved surface.

15. A stage apparatus according to claim 1, further comprising:
   a pair of second actuators for generating a displacement for moving the movable table in a first direction; and
   a pair of second displacement amplifying mechanisms for amplifying the displacement of the pair of second actuators and transmitting it to the pair of second elastic portions,
   the second displacement amplifying mechanism comprising a third amplifying arm, a third elastic connecting portion for rotatably connecting the third amplifying arm to the fixed base, a fourth amplifying arm extending in parallel to the third amplifying arm and connected to the elastic portion, a fourth elastic connecting portion for rotatably connecting the fourth amplifying arm to the fixed base, and a connecting member for connecting the third amplifying arm to the fourth amplifying arm, and
   the second actuator extending toward the third amplifying arm across the fourth amplifying arm.

16. A stage apparatus according to claim 15, wherein the fourth amplifying arm has a cavity and the second actuator extends therethrough.

17. A stage apparatus according to claim 16, wherein the cavity comprises a through hole formed in the fourth amplifying arm.

18. A stage apparatus according to claim 16, wherein the cavity comprises a through groove formed in the fourth amplifying arm.

19. A stage apparatus according to claim 15, wherein the third elastic connecting portion and the fourth elastic connecting portion have different shapes.

20. A stage apparatus according to claim 19, wherein the third elastic connecting portion and the fourth elastic connecting portion have shapes which suppress the stress of the third and fourth elastic connecting portions less than the maximum allowable stress of materials of the third and fourth elastic connecting portions, respectively.

21. A stage apparatus according to claim 19, wherein the connecting member has a connecting amplifying arm, a third connecting elastic portion for connecting the connecting amplifying arm to the third amplifying arm and a fourth connecting elastic portion for connecting the connecting amplifying arm to the fourth amplifying arm, and each of the third elastic connecting portion, the fourth elastic connecting portion, the third connecting elastic portion and the fourth connecting elastic portion comprises an arc-shaped hinge.

22. A stage apparatus according to claim 15, wherein the third amplifying arm includes a receiving member brought into contact with the second actuator, and the receiving member disperses a force of the actuator and transmits to the third amplifying arm.

23. A stage apparatus according to claim 22, wherein the receiving member is made of a material harder than that of the third amplifying arm.

24. A stage apparatus according to claim 22, wherein the second actuator has a pressing member provided at a front end thereof and the pressing member is brought into contact with the receiving member.

25. A stage apparatus according to claim 24, wherein the pressing member is made of a material harder than that of the third amplifying arm.

26. A stage apparatus according to claim 24, wherein one of the pressing member and the receiving member brought into contact with each other has a curved surface.

27. A stage apparatus including a displacement amplifying mechanism, which has a first axis and a second axis perpendicular thereto, the apparatus comprising:
   a fixed base;
   a movable table to be moved with respect to the fixed base;
   a pair of first elastic portions arranged between the fixed base and the movable table and provided in both sides of the movable table along the first axis in a symmetrical manner;
   a pair of second elastic portions arranged between the fixed base and the movable table and provided in both sides of the movable table along the second axis in a symmetrical manner;
   a pair of first actuators for generating a displacement for moving the movable table in a second direction; and
   a pair of first displacement amplifying mechanisms, arranged between the fixed base and the pair of first elastic portions, for amplifying the displacement of the pair of first actuators and transmitting it to the pair of first elastic portions,
   the first displacement amplifying mechanism comprising a pair of rotatable first amplifying arms extending along the first axis, the first amplifying arm having one end connected to the first elastic portion and the other end connected to the fixed base so as to rotate according to a press by the first actuator, a pair of first pretension springs for urging the first amplifying arm in a direction opposite to the press of the first actuator, and a pair of first load adjusting mechanism for adjusting the urging force by applying a load to the first pretension spring.

28. A stage apparatus according to claim 27, wherein the first elastic portion has a relatively low rigidity along the first axis and has a relatively high rigidity along the second axis, and the second elastic portion has a relatively high rigidity along the first axis and has a relatively low rigidity along the second axis.

29. A stage apparatus according to claim 28, wherein the first elastic portion comprises a long rectangular spring along the second axis having a hollow portion, and the second elastic portion comprises a long rectangular spring along the first axis having a hollow portion.

30. A stage apparatus according to claim 27, wherein the first pretension spring comprises a first arm extending from the first amplifying arm to a side direction and having a notch in the middle, and the first load adjusting mechanism comprises a screw provided in the fixed base for pressing the front end portion of the first arm.

31. A stage apparatus according to claim 27, wherein the first pretension spring comprises a coil spring connected to the first amplifying arm, and the first load adjusting mechanism comprises a screw provided in the fixed base.

32. A stage apparatus according to claim 27, wherein the first amplifying arm includes a receiving member brought into contact with the first actuator, and the receiving member disperses a force of the actuator and transmits to the first amplifying arm.

33. A stage apparatus according to claim 32, wherein the receiving member is made of a material harder than that of the first amplifying arm.

34. A stage apparatus according to claim 32, wherein the receiving member has a curved surface.

35. A stage apparatus according to claim 27, further comprising:
- a pair of second actuators for generating a displacement for moving the movable table in the first direction; and
- a pair of second displacement amplifying mechanisms for amplifying the displacement of the pair of second actuators and transmitting it to the pair of second elastic portions,
- the second displacement amplifying mechanism comprising a pair of rotatable second amplifying arms extending along the second axis, the second amplifying arm having one end connected to the second elastic portion and the other end connected to the fixed base so as to rotate according to a press by the second actuator, a pair of second pretension springs for urging the second amplifying arm in a direction opposite to the press of the second actuator, and a pair of second load adjusting mechanism for adjusting the urging force by applying a load to the second pretension spring.

36. A stage apparatus according to claim 35, wherein the second pretension spring comprises a second arm extending from the second amplifying arm to a side direction and having a notch in the middle, and the second load adjusting mechanism comprises a screw provided in the fixed base for pressing the front end portion of the second arm.

37. A stage apparatus according to claim 35, wherein the second pretension spring comprises a coil spring connected to the second amplifying arm, and the second load adjusting mechanism comprises a screw provided in the fixed base.

38. A stage apparatus according to claim 35, wherein the second amplifying arm includes a receiving member brought into contact with the second actuator, and the receiving member disperses a force of the actuator and transmits to the second amplifying arm.

39. A stage apparatus according to claim 38, wherein the receiving member is made of a material harder than that of the second amplifying arm.

40. A stage apparatus according to claim 38, wherein the receiving member has a curved surface.

41. A stage apparatus including a displacement amplifying mechanism, which has a first axis and a second axis perpendicular thereto, the apparatus comprising:
- a fixed base;
- a movable table to be moved with respect to the fixed base;
- a pair of first elastic portions arranged between the fixed base and the movable table and provided in both sides of the movable table along the first axis in a symmetrical manner;
- a pair of second elastic portions arranged between the fixed base and the movable table and provided in both sides of the movable table along the second axis in a symmetrical manner;
- a pair of first actuators for generating a displacement for moving the movable table in a second direction; and
- a pair of first displacement amplifying mechanisms, arranged between the fixed base and a pair of first elastic portions, for amplifying the displacement of a pair of first actuators and transmitting it to a pair of first elastic portions,
- the first displacement amplifying mechanism comprising a pair of rotatable first amplifying arms extending along the first axis, the first amplifying arm having one end connected to the first elastic portion and the other end connected to the fixed base so as to rotate according to a press by the first actuator.

42. A stage apparatus according to claim 41, wherein the first elastic portion has a relatively low rigidity along the first axis and has a relatively high rigidity along the second axis, and the second elastic portion has a relatively high rigidity along the first axis and has a relatively low rigidity along the second axis.

43. A stage apparatus according to claim 42, wherein the first elastic portion comprises a long rectangular spring along the second axis having a hollow portion, and the second elastic portion comprises a long rectangular spring along the first axis having a hollow portion.

44. A stage apparatus according to claim 41, wherein the first amplifying arm includes a receiving member brought into contact with the first actuator and the receiving member disperses a force of the actuator so as to transmit to the first amplifying arm.

45. A stage apparatus according to claim 44, wherein the receiving member is made of a material harder than that of the first amplifying arm.

46. A stage apparatus according to claim 44, wherein the first actuator has a pressing member provided at a front end thereof and the pressing member is brought into contact with the receiving member.

47. A stage apparatus according to claim 46, wherein the pressing member is made of a material harder than that of the first amplifying arm.

48. A stage apparatus according to claim 46, wherein one of the pressing member and the receiving member brought into contact with each other has a curved surface.

49. A stage apparatus according to claim 41, further comprising:
- a pair of second actuators for generating a displacement for moving the movable table in a first direction; and
- a pair of second displacement amplifying mechanisms for amplifying the displacement of a pair of second actuators and transmitting it to a pair of second elastic portions,
- the second displacement amplifying mechanism comprising a pair of rotatable second amplifying arms extending along the second axis, the second amplifying arm having one end connected to the second elastic portion and the other end connected to the fixed base so as to rotate according to a press by the second actuator.

50. A stage apparatus according to claim 49, wherein the second amplifying arm includes a receiving member brought into contact with the second actuator, and the receiving member disperses a force of the actuator and transmits to the second amplifying arm.

51. A stage apparatus according to claim 50, wherein the receiving member is made of a material harder than that of the second amplifying arm.

52. A stage apparatus according to claim 50, wherein the second actuator has a pressing member provided at a front end thereof and the pressing member is brought into contact with the receiving member.

53. A stage apparatus according to claim 52, wherein the pressing member is made of a material harder than that of the second amplifying arm.

54. A stage apparatus according to claim 52, wherein one of the pressing member and the receiving member brought into contact with each other has a curved surface.

* * * * *